(12) United States Patent
Hong

(10) Patent No.: US 6,404,572 B1
(45) Date of Patent: Jun. 11, 2002

(54) CIRCUIT AND METHOD FOR GENERATING A WRITE PRECOMPENSATION SIGNAL

(75) Inventor: Ghy-Boong Hong, Allentown, PA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/305,388

(22) Filed: May 5, 1999

(51) Int. Cl.$^7$ .............................. G11B 5/09; G11B 20/10
(52) U.S. Cl. .............................. 360/45; 360/76; 360/51
(58) Field of Search .............................. 360/68, 51, 46, 360/45; 327/362, 99, 262, 276

(56) References Cited

U.S. PATENT DOCUMENTS

| | | | |
|---|---|---|---|
| 3,576,430 A | * 4/1971 | Fickenscher et al. | 235/437 |
| 4,000,513 A | * 12/1976 | Precourt | 360/45 |
| 4,885,645 A | * 12/1989 | Hashimoto | 360/45 |
| 4,964,107 A | * 10/1990 | Galbraith et al. | 368/120 |
| 5,136,436 A | * 8/1992 | Kahlman | 360/40 |
| 5,517,146 A | 5/1996 | Yamasaki | 327/276 |
| 5,594,377 A | * 1/1997 | Choi et al. | 327/278 |
| 5,598,364 A | * 1/1997 | McCall et al. | 365/73 |
| 5,986,830 A | * 11/1999 | Hein | 360/45 |
| 6,091,558 A | * 7/2000 | Voorman et al. | 360/46 |
| 6,133,861 A | * 10/2000 | Jusuf et al. | 341/68 |
| 6,212,024 B1 | * 4/2001 | Igarashi et al. | 360/51 |
| 6,288,858 B1 | * 9/2001 | Arnett et al. | 360/45 |

FOREIGN PATENT DOCUMENTS

| | | | |
|---|---|---|---|
| EP | 809246 A2 | * 11/1997 | G11B/20/10 |
| JP | 10069605 A | * 3/1998 | G11B/05/09 |

* cited by examiner

*Primary Examiner*—David Hudspeth
*Assistant Examiner*—Dan I. Davidson
(74) *Attorney, Agent, or Firm*—Bret J. Petersen; W. James Brady; Frederick J. Telecky, Jr.

(57) ABSTRACT

A circuit that generates a write precompensation delay signal includes a precoder, a delayed clock pulse selector, a delayed clock pulse generator, and a non-return-to-zero (NRZ) modulator. A master clock signal and serialized data operating at the master clock rate are inputs to the precoder which generates a precoded data signal operating at the master clock rate. The delayed clock pulse selector generates clock pulse selection signals based on the precoded data. The delayed clock pulse generator generates at least two delayed clock signals, selects either none or one of the delayed clock signals according to the clock pulse selection signals, and generates a return-to-zero (RZ) signal whose time periods comprise either a zero if no delayed clock signal is selected or a pulse of the selected delayed clock signal. The NRZ modulator generates the precompensation signal from the RZ signal, and the precompensation signal has a maximum precompensation delay of at least 50% of the master clock time period. Preferably, the precompensation circuit also includes a ramp waveform and threshold voltage generator to generate at least one ramp waveform and at least two threshold voltages. A preferred embodiment of the invention includes time-interleaving the precoded data into odd and even data sequences each operating at half the master clock rate. In this case, the ramp waveform and threshold voltage generator preferably generates an odd and an even waveform.

21 Claims, 16 Drawing Sheets

CIRCUIT AND METHOD FOR GENERATING A WRITE PRECOMPENSATION SIGNAL

TECHNICAL FIELD OF THE INVENTION

This invention relates generally to the field of hard-disk drives. More specifically, this invention relates to an improved circuit architecture and method to generate write precompensation delay in a high-density, partial-response magnetic recording system.

BACKGROUND OF THE INVENTION

A hard-disk drive ("HDD") in a computer system contains tracks onto which information is stored magnetically. This information is stored as a series of magnetic polarity transitions (i.e., ones and zeros), and is stored on the disk drive as the drive rotates. The magnetized areas on the disk act like individual magnets. As the density of information stored on the disk increases, the poles of the areas begin to interact causing the magnetized areas to shift, and inter-symbol interference increases. This, in turn, causes errors when the data is read.

"Write precompensation" (WPC) is used to solve this problem. Precompensation (or "precompensation delay") is necessary to compensate the non-linearity of transition edges arising in magnetic media recording. WPC shifts data bits forward when they are being written to the disk in order to compensate for shifting that occurs when a data bit is written next to it. When the next data bit is written, the interaction between the poles shifts the data bit into its proper position.

In a HDD partial-response system, one method of implementing WPC is to use the master clock (which is used to write the data to the disk) to generate a ramp waveform and then to compare the ramp waveform to threshold voltages to generate delayed triggering pulses for the data transition edges. As shown in FIG. 1, ramp waveform 120 has the same frequency as master clock 110. For one half of each period of ramp waveform 120, the waveform is at a high level. For the other half of each period of ramp waveform 120, the waveform linearly decreases toward a low level. When the ramp voltage becomes less than a threshold voltage, a clock pulse is generated whose rising edge is time-delayed from the start of the ramp. For a high threshold voltage 130, the delayed clock pulses 155 are wider; for a low threshold voltage 140, the delayed clock pulses 165 are narrower, and their rising edges begin later.

Precompensation delay is determined by the delay between the rising edges of the delayed clock pulses. By convention, high threshold delayed clock signal 150 is considered the reference delay clock, generating 0% precompensation delay. The precompensation delay amount generated by low threshold voltage delayed clock signal 160 is the percentage of the full master clock period between its rising edge and that of the reference delay clock. In the example shown in FIG. 1, approximately 30% of the master clock period lies in interval 170 between the rising edges of the two delayed clocks. Thus, the system in FIG. 1 can provide 30% precompensation delay.

The type of system in FIG. 1 is limited in the amount of delay it can provide, relative to the master clock period. Because the ramp waveform is high for half the master clock period, the theoretical maximum delay, assuming all voltages and switching times are exact, is limited to less than half the master clock period. For a practical system, some margin must be included and the threshold voltages must be set well away from the high and low levels of the ramp waveform. Therefore, as in the system of FIG. 1, the maximum delay is limited to around 30% of the master clock period. As recording density and clock rate increases, the switching time between adjacent transitions is reduced, and the amount of precompensation required increases as a percentage of the switching time. As required precompensation increases to over 30% and more, these conventional WPC circuits are not able to supply enough precompensation delay.

SUMMARY OF THE INVENTION

Therefore, a need has arisen for an improved write precompensation signal generation circuit and method which allow precompensation of more than 50% of the master clock period.

In accordance with the present invention, a circuit for generating a write precompensation signal having precompensation delay includes a precoder, a delayed clock pulse selector, a delayed clock pulse generator, and a non-return-to-zero (NRZ) modulator. A master clock signal and serialized data operating at the master clock rate are inputs to the precoder which generates a precoded data signal operating at the master clock rate. The delayed clock pulse selector generates clock pulse selection signals based on the precoded data. The delayed clock pulse generator generates at least two delayed clock signals, selects either none or one of the delayed clock signals according to the clock pulse selection signals, and generates a return-to-zero (RZ) signal whose time periods comprise either a zero if no delayed clock signal is selected or a pulse of the selected delayed clock signal. The NRZ modulator generates the precompensation signal from the RZ signal, and the precompensation signal has a maximum precompensation delay of at least 50% of the master clock time period.

Preferably, the precoder includes a D-flip flop whose clock input operates at the master clock rate and an XOR gate which has the serialized input data as its first input and the output of the D-flip flop as its second input. The output of the XOR gate is provided to the data input of the D-flip flop, and the output of the D-flip flop is the precoded data signal.

Preferably, when four delayed clock signals are generated, the clock pulse selection signals are based on the current precoded data and the prior two precoded data bits. If the current precoded data bit equals zero, the delayed clock pulse generator selects no delayed clock signal. If the current precoded data bit equals one, the delayed clock pulse generator selects one delayed clock signal based on the values of the previous two precoded data bits, as follows: (1) the first delayed clock signal is selected when the previous two precoded data bits both equal zero; (2) the second delayed clock signal is selected when the previous two precoded data bits equal a zero and a one, respectively; (3) the third delayed clock signal is selected when the previous two precoded data bits equal a one and a zero, respectively; and (4) the fourth delayed clock signal is selected when the previous two precoded data bits both equal one.

Preferably, the precompensation circuit also includes a ramp waveform and threshold voltage generator to generate at least one ramp waveform and at least two threshold voltages. The delayed clock pulse generator compares the ramp waveform to the threshold voltages to generate the delayed clock signals. More specifically, there is also a current generator that generates a current that is proportional to the master clock frequency and provides the proportional current to the ramp waveform and threshold voltage generator. Because of the proportional current, the peak-to-peak voltage of the ramp waveform is maintained constant regardless of the master clock rate.

A preferred embodiment of the present invention also includes a time-interleaver which time-interleaves the precoded data signal into odd and even data sequences each operating at half the master clock rate. The clock pulse selection signals are then based on the time-interleaved data sequences. The delayed clock pulse generator generates at least two odd and two even delayed clock signals and generates an odd RZ signal and an even RZ signal, each of which operates at half the master clock rate. The NRZ modulator generates the RZ signal by combining the odd and even RZ signals. Preferably, the ramp waveform and threshold voltage generator generates an odd and an even waveform.

Preferably, the time-interleaver includes a D-flip flop, whose clock input operates at the master clock rate, that generates an odd clock signal and an even clock signal, each of which operates at half the master clock rate. The time-interleaver also includes a series of odd D-flip flops clocked by the odd clock signal and a series of even D-flip flops clocked by the even clock signal. The precoded data signal is provided to the odd and even series of D-flip flops which output the odd and even data sequences.

The method for generating the write precompensation signal having precompensation delay includes precoding the serialized input data operating at the master clock rate, generating at least two delayed clock signals, selecting either none or one of the delayed clock signals based on the precoded data, generating an RZ signal operating at the master clock rate, and generating the precompensation signal as an NRZ version of the RZ signal. Each time period of the RZ signal comprises either a zero if no delayed clock signal is selected or a pulse of the selected delayed clock signal. The precompensation signal has a maximum precompensation delay of at least 50% of the master clock time period.

Preferably, the preceding step provides the serialized input data bits to a first input of a two-input XOR gate, providing the output from the XOR gate to the input of a D-flip flop whose clock input operates at the master clock rate, and providing the output from the D-flip flop to the second input of the XOR gate. The output of the D-flip flop is the precoded data signal.

Preferably, the delayed clock pulse generating step generates four delayed clock signals. The delayed clock signals are selected according to the following protocol: if the current precoded data bit equals zero, no delayed clock signal is selected, and if the current precoded data bit equals one, a delayed clock signal is selected based on the values of the previous two precoded data bits, as follows: (1) a first delayed clock signal is selected when the previous two precoded data bits both equal zero; (2) a second delayed clock signal is selected when the previous two precoded data bits equal a zero and a one, respectively; (3) a third delayed clock signal is selected when the previous two preceded data bits equal a one and a zero, respectively; and (4) a fourth delayed clock signal is selected when the previous two precoded data bits both equal one.

Preferably, the delayed clock signal generation step includes generating a ramp waveform, generating a threshold voltage, providing the threshold voltage to the non-inverting input of a comparator, and providing the ramp waveform to the inverting input of the comparator. The output of the comparator is the delayed clock signal.

Preferably, the ramp waveform has a constant peak-to-peak voltage regardless of the master clock rate.

A preferred embodiment of the method of the present invention also includes time-interleaving the precoded data signal into odd and even data sequences each operating at half the master clock rate and generating at least two odd and two even delayed clock signals. The RZ signal is a combination of an odd RZ signal and an even RZ signal, the odd and even RZ signals operating at half the master clock rate.

Preferably, the time-interleaving step includes generating an odd clock signal and an even clock signal each operating at half the master clock rate and providing the precoded data to an odd series of D-flip flops clocked by the odd clock signal and to an even series of D-flip flops clocked by the even clock signal.

The present invention provides various technical advantages. As used in a HDD system, one technical advantage is that a write precompensation signal is generated that provides more than 50% precompensation delay. Another technical advantage is the use of a current which is proportional to zone frequency. This current provides a fixed ramp waveform peak-to-peak amplitude regardless of zone frequency. Another technical advantage is that as HDD operating speeds increase, the present invention provides such precompensation delay robustly and minimizes inter-symbol interference.

Other technical advantages of the present invention will be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawing, wherein like reference numerals represent like parts, in which.

DETAILED DESCRIPTION OF THE INVENTION

Figure 2:
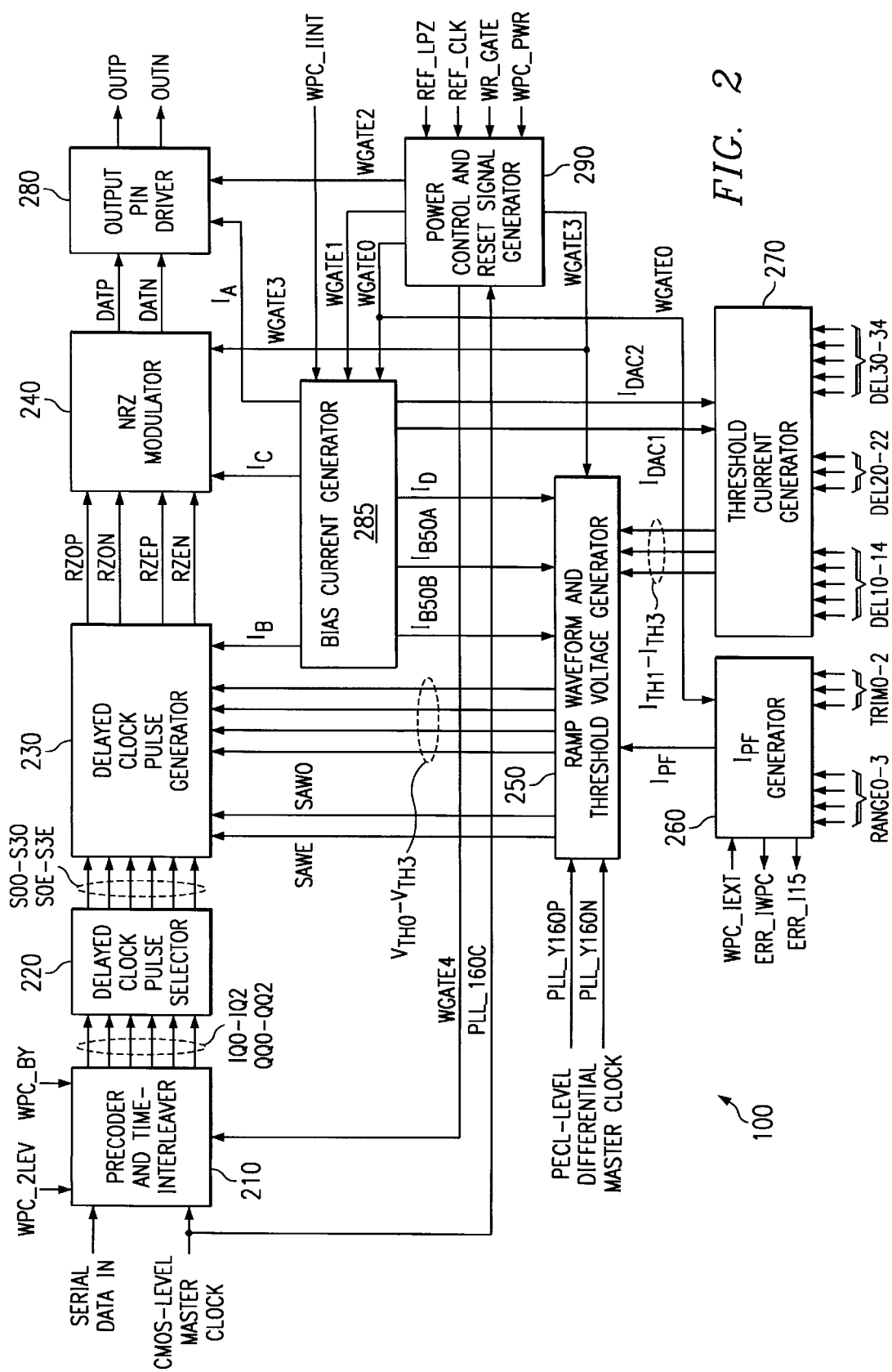
FIG. 2 is a block diagram of a write precompensation circuit in accordance with an embodiment of the present invention.

This invention describes a new architecture to modulate data transition edges in HDD magnetic recording systems. For data operating at a master clock rate, the system precodes the data, generates at least two delayed clocks, selects a pulse of one of the delayed clocks based on the precoded data, and generates an NRZ signal from the delayed clock pulses. The system generates at least 50% precompensation because at least one of the delayed clocks is high for at least half a master clock period. In contrast to previous architectures, this one preferably time-interleaves the data and reduces the switching time by a factor of two. This time-interleaving scheme uses two master clock periods to switch, compared to using one master clock period in conventional schemes. The maximum achievable precompensation amount is therefore extended over the prior art by ramping a voltage for a full master clock period. As shown in FIG. 2, the main blocks of the WPC circuit 100 are a precoder & time-interleaver 210, a delayed clock pulse selector 220, a delayed clock pulse generator 230, an NRZ modulator 240, and a ramp waveform & threshold voltage generator 250.

Delayed clock pulse generator 230 produces at least two, and preferably four, delayed clock signals, CLK0–CLK3, which generate different amounts of precompensation. These delayed clock signals are produced by comparing threshold voltages (VTH0–VTH3) to odd and even ramp waveforms. The threshold voltages are derived from three threshold currents ($I_{TH1}$–$I_{TH3}$) generated by threshold current generator 270. Threshold current generator 270 contains three separate digital-to-analog converters (DACs), whose inputs come from three DELAY registers (DEL10–14, DEL20–22, DEL30–34). Thus, the delay of each delayed clock signal is set by the DELAY registers.

The ramp waveforms are generated by using a PECL ("positive emitter-coupled logic")-level clock operating at half the master clock rate to switch the ramp waveform generator to cover a full master clock period. The HDD contains a number of zones, each of which is written to at its own "zone frequency." By using a current source proportional to frequency, generated by $I_{PF}$ generator 260, the peak-to-peak amplitude of the ramp is fixed regardless of the zone frequency used.

The precoder generates a data sequence based on the serial input data. If the current serial data bit is low, the output of the precoder remains the same; if the current serial data bit is high, the output of the precoder toggles. This "1/1⊕D" precoding thus identifies the data transitions of the serial input data. One of the delayed clock signals is selected, separately for odd and even sequences, according to the two previous precoder output bits. Odd and even RZ signals are generated composed of pulses from the selected delayed clock signals. The RZ signals are combined, and the combined signal is used to toggle a flip-flop to generate an NRZ signal in NRZ modulator 240, whose output passes through an output pin driver 280 to drive the output pins.

To implement the interleaved precompensation scheme, the master clock signal is divided by two into in-phase and out-of-phase clocks. The output of the precoder is shifted two master clock time periods and then latched by the divided in-phase and out-of-phase clocks to generate the odd and even sequences, respectively. For proper operation, the clock dividers used to generate the ramp waveforms and latching precoder outputs should start in phase. To ensure such phase synchronization, power control & reset signal generator 290, among other functions, synchronizes a control signal called WR_GATE with the master clock.

In the circuit realization of the present invention, two write precompensation options are provided. Two-level precompensation, in which the present bit transition is a function of the previous two bits, as discussed above, is the preferred mode and is chosen by setting a signal called WPC_2LEV high. If this signal is low, one-level precompensation, in which the present transition is a function of the previous bit only, is selected. Time-interleaving is still used—however, the amount of precompensation is more limited than in two-level precompensation. For a maximum delay of 50%, the precompensation delays are programmable through the three DELAY registers in increments of 1.6% of the master clock time period. WPC signals are output in differential PECL levels to minimize common-mode noise.

More specifically, referring to FIG. 2, serial data is provided to precoder & time-interleaver 210, which is clocked by CMOS-level master clock PLL_160C, and which outputs six sequences, IQ0–IQ2 and QQ0–IQ2. The master clock is divided by two to generate a derived clock operating at half the master clock rate. This "derived" clock clocks the six IQ and QQ sequences, in which the "I" sequences are out-of-phase with the "Q" sequences by half a derived clock cycle. The six sequences are provided to delayed clock pulse selector 220 which outputs eight selection sequences, S0O–S3O and S0E–S3E, which also operate at the derived clock rate, and the odd sequences are out-of-phase with the even sequences by half a derived clock cycle. For each clock cycle of IQ0–IQ2, zero or one of S0O–S3O will be high based on the values of IQ0, IQ1, and IQ2. Similarly, for each clock cycle of QQ0–IQ2, zero or one of S0E–S3E will be high based on the values of QQ0, QQ1, and QQ2. These eight sequences are provided to delayed clock pulse generator 230 which also has as inputs two ramp waveforms, SAWO and SAWE, and four threshold voltage inputs, $V_{THO}$–$V_{TH3}$, from ramp waveform & threshold voltage generator 250.

The two ramp waveforms operate at the derived clock rate, but are out-of-phase with each other by half a derived clock cycle. For the first half of its clock cycle, each waveform is the maximum of a square wave; for the latter half of its clock cycle, each waveform ramps down from the maximum square wave level to the minimum square wave level. The threshold voltages have values between the maximum and minimum square wave levels.

Within delayed clock pulse generator 230, each ramp waveform is compared to the four threshold voltages, forming the four delayed clock signals which operate at the derived clock rate, CLK0–CLK3, but which have different duty cycles based on the specific threshold voltage. The S0O–S3O and S0E–S3E sequences operate as switches on the delayed clock signals, the odd group operating on the delayed clock signals derived from the SAWO waveform and the even group operating on the delayed clock signals derived from the SAWE waveform. The switches choose which of the four delayed clock signals, if any, will propagate its pulse during any derived clock cycle. Delayed clock pulse generator 230 generates two return-to-zero (RZ) differential sequences, RZEP/RZEN and RZOP/RZON, operating at the derived clock rate. RZEP/RZOP is the sequence derived from pulses propagated due to the even waveform and RZOP/RZON is the sequence derived from pulses propagated due to the odd waveform. They are out-of-phase with each other by half a derived clock cycle.

These waveforms are provided to NRZ modulator 240 which adds the two differential waveforms to each other and generates a differential NRZ sequence, DATP/DATN. This differential NRZ sequence is then provided to output pin driver 280 which shifts the DC level of the sequence, adjusts its signal swing, and provides strong driving signals.

These blocks are supported by several other blocks. Threshold current generator 270 generates the currents needed to generate the threshold voltages in ramp waveform & threshold voltage generator 250. $I_{PF}$ generator 260 generates a current, $I_{PF}$, proportional to the master clock frequency, which is then used to produce the ramp waveforms and to maintain a constant ramp amplitude. Bias current generator 285 generates currents used in the operation of output pin driver 280, delayed clock pulse generator 230, NRZ modulator 240, ramp waveform & threshold voltage generator 250, and threshold current generator 270. Finally, power control & reset signal generator 290 generates control signals that place the WPC in low-power or standby mode when necessary and that resynchronize precoder & time-interleaver 210, ramp waveform & threshold voltage generator 250, and NRZ modulator 240 with each other. Each of the blocks is described in more detail below.

Not shown in FIG. 2 are other modules, signals, and power sources that are used in the HDD system and that support the WPC circuit. First, the device technologies used are CMOS and PECL. There are three power sources for the chips used in the WPC circuit: $DV_{CC}$, $AV_{CC}$, and $PV_{CC}$. $DV_{CC}$ is 5V and supplies the power to the CMOS and digital devices. $AV_{CC}$ is 4.25V and supplies the power to the analog devices. Its level is regulated by a power regulator block. $PV_{CC}$ is also 5V, can source high currents, and supplies the power to the components in output pin driver 280. Second, data are normally stored in parallel mode, but are converted to serial mode in order to generate the write precompensation signal. Third, a timing block generates the clocks used in the WPC circuit. This timing block generates the PECL-level differential master clock, PLL_Y160P/N, which is the global reference clock for the entire system, and the CMOS-level master clock, PLL_160C, a derivative of the PECL-level clock. Fourth, an error block receives several inputs from $I_{PF}$ generator 260. This error block is used for monitoring the WPC circuit.

Precoder & Time-Interleaver

Figure 1:
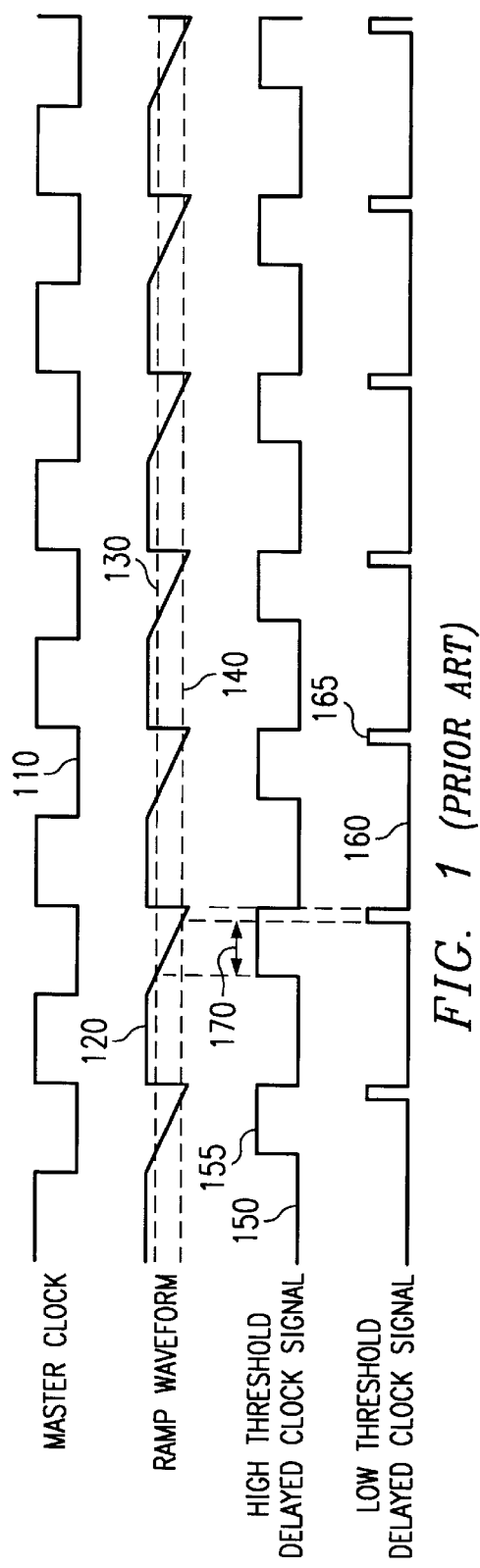
FIG. 1 is a timing diagram of a prior art write precompensation circuit.
Figure 3A:
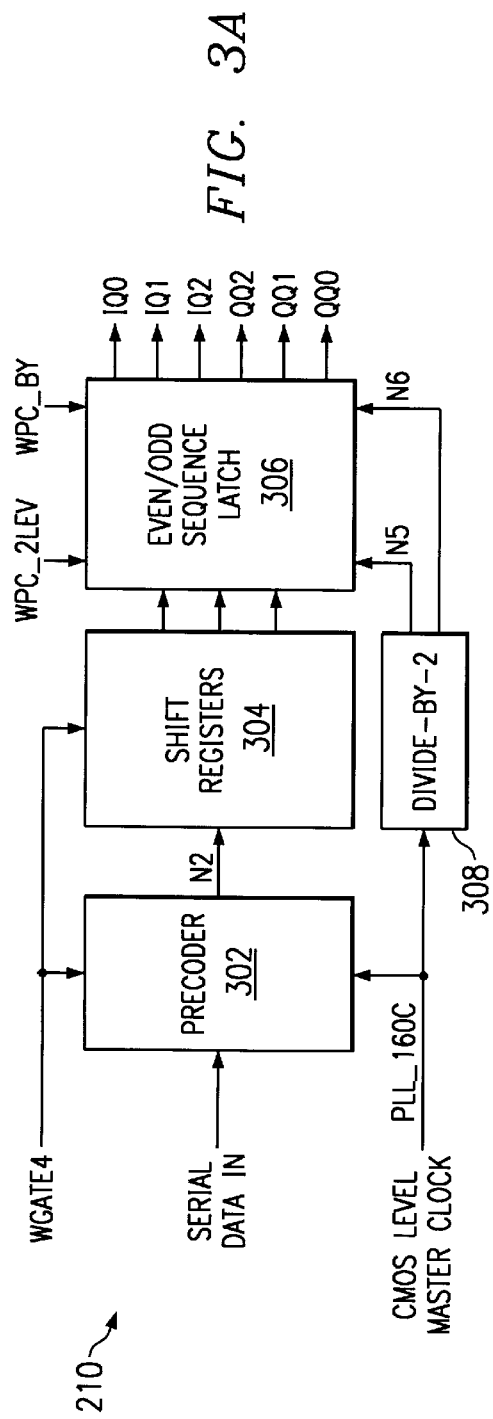
FIG. 3A is a block diagram of the precoder and time-interleaver block of FIG. 2.
Figure 3B:
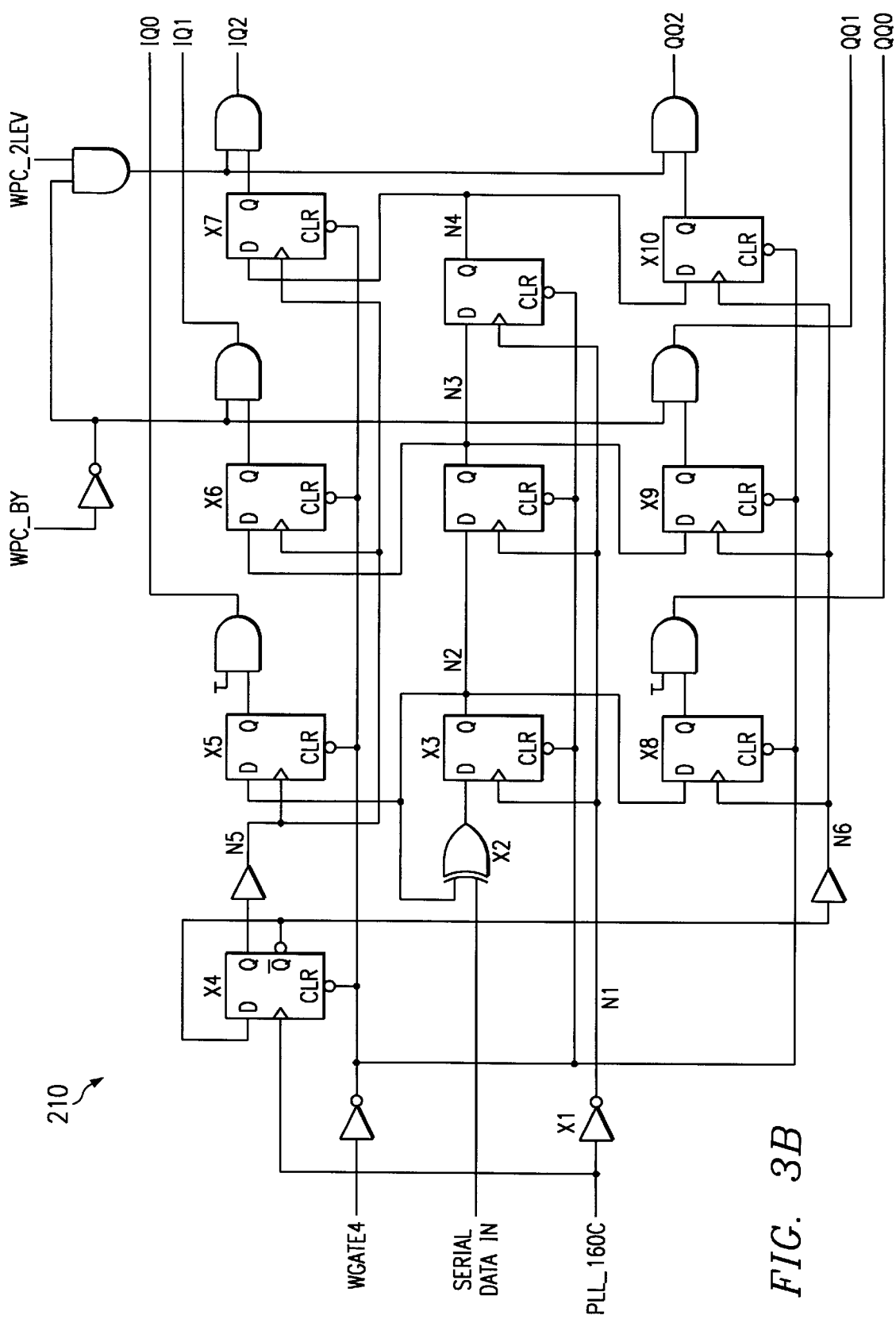
FIG. 3B is a circuit schematic of the block illustrated in FIG. 3A.
Figure 3C:
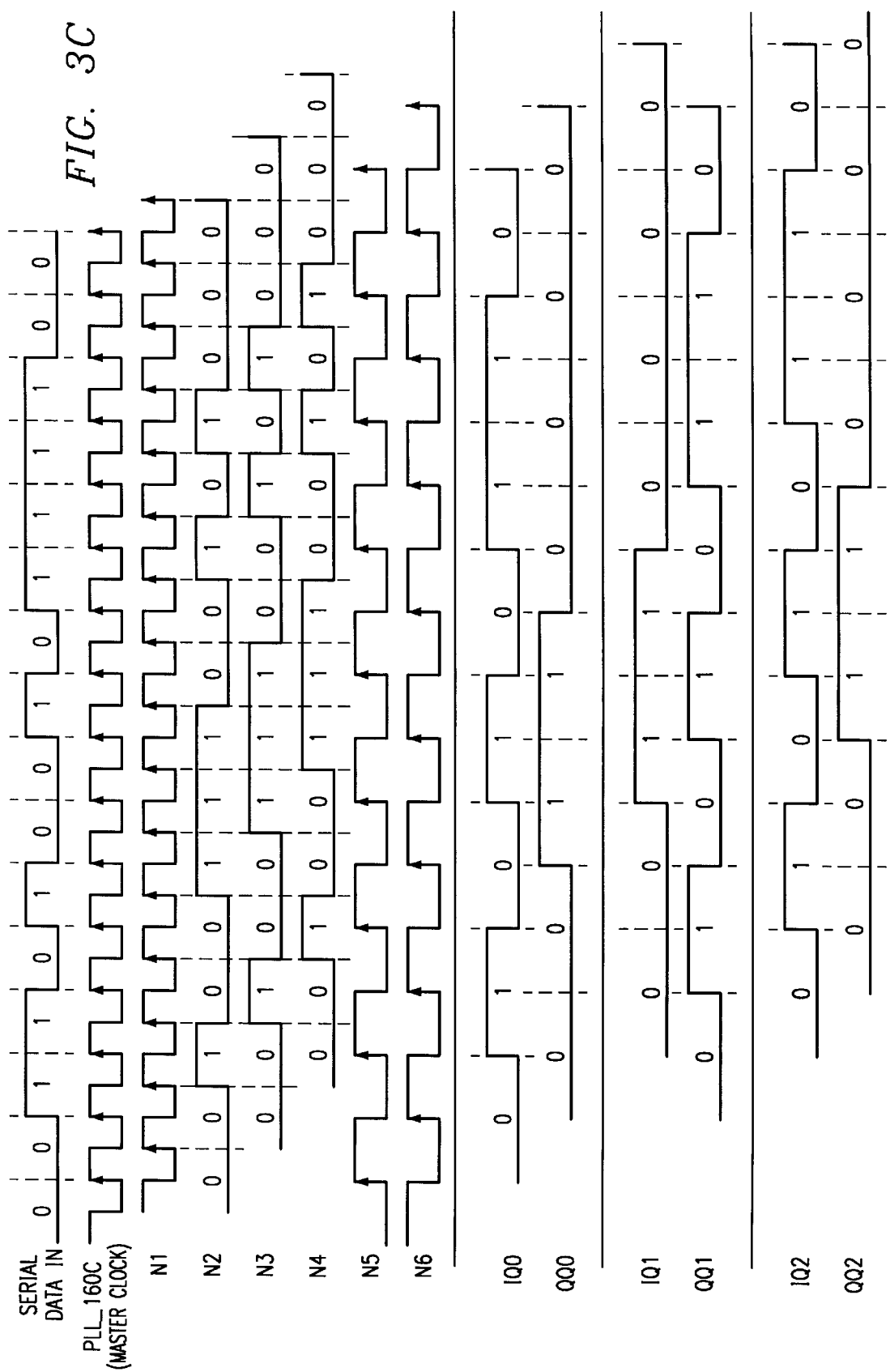
FIG. 3C is a timing diagram of the circuit illustrated in FIG. 3B.

FIG. 3A is a block diagram of precoder & time-interleaver 210, FIG. 3B is a circuit schematic, and FIG. 3C is a timing diagram of the circuit. The CMOS-level master clock, PLL_160C, and serial data operating at the master clock rate are the main inputs to precoder & time-interleaver 210. Using the inverse of PLL_160C, i.e., using the falling edge of PLL_160C, precoder 302 performs a 1/1⊕D operation on the serial data. The precoded output, N2, is provided to shift registers 304 which output the undelayed precoded data sequence and one-bit and two-bit delayed precoded sequences to even/odd sequence latch 306. PLL_160C is also provided to divide-by-2 308 which outputs in-phase derived clock N5 and out-of-phase derived clock N6 to even/odd sequence latch 306. Clocks N5 and N6 operate at half the master clock rate. In even/odd sequence latch 306, clocks N5 and N6 clock the undelayed and one-bit and two-bit delayed versions of the precoded data to generate six, time-interleaved data sequences, IQ0, IQ1, IQ2, QQ0, QQ1, and QQ2. These six sequences will subsequently be used to select the appropriate delayed clock signal associated with each serial data transition.

In more detail in FIG. 3B, precoder 302 comprises inverter X1, XOR gate X2, and D-flip flop X3. Serial data is provided to an input of XOR gate X2; the other XOR gate input is the output from D-flip flop X3. Because of inverter X1, flip-flop X3 is clocked by the falling edge of master clock PLL_160C, clock N1. 1/1⊕D precoding operates as follows: if the current data bit is a "0," the output of the precoder remains the same; if the data bit is a "1," the output of the precoder toggles. Thus, as shown in FIG. 3C, a data stream of 0011 0100 101 1100 is precoded to 0010 0111 0010 1000.

The time-interleaving function uses D-flip flop X4 to divide master clock PLL_160C by two. D-flip flop X4 is clocked by PLL_160C, and its D-input is the $\overline{Q}$ output of X4. The Q and $\overline{Q}$ outputs of X4 are provided to buffers to respectively generate in-phase derived clock N5 and out-of-phase derived clock N6. Clock N5 clocks odd sequences IQ0–IQ2, and clock N6 clocks even sequences QQ0–IQ2. The precoded output, N2, is shifted one bit to generate N3, which, in turn, is shifted one bit to generate N4. Thus, N2 is the undelayed precoded sequence, N3 is the one-bit delayed precoded sequence, and N4 is the two-bit delayed precoded sequence. Sequences N2, N3, and N4 are provided to odd sequence D-flip flops X5, X6, X7 and to even sequence D-flip flops X8, X9, X10.

Because of time-interleaving, IQ0 contains the first, third, fifth, etc. bits of the undelayed precoded sequence, QQ1 contains the same bits, delayed by half a derived clock period, and IQ2 contains the same bits, further delayed from QQ1 by half a derived clock period. (See FIG. 3C.) Analogously, QQ0 contains the second, fourth, sixth, etc. bits of the undelayed precoded sequence, IQ1 contains the same bits, delayed by half a derived clock period, and QQ2 contains the same bits, further delayed by half a derived clock period.

It is preferable to use the current precoded bit and the previous two bits, i.e., "two-level precompensation." This is accomplished by setting input signal WPC_2LEV high. However, "one-level precompensation," i.e., using only the current precoded bit and the previous bit, can be chosen by setting WPC_2LEV low.

Two other signals, WPC_BY and WGATE4, are used in the circuit implementation of precoder & time-interleaver 210. WPC_BY, if high, serves to bypass the precompensation function by disregarding any previous bits, and is used for testing purposes. Thus, in normal operation, WPC_BY is kept low. WGATE4 comes from power control & reset signal generator 290 and serves to synchronize the circuit. When WGATE4 is high, it causes the D-flip flops in precoder & time-interleaver 210 to reset in order to reestablish the correct phase relationship between the serial data and the ramp waveforms.

Delayed Clock Pulse Selector

Delayed clock pulse selector 220 takes the odd and even delayed and undelayed precoded sequences from precoder & time-interleaver 210 (IQ0–IQ2 and QQ0–IQ2) and uses those sequences to output four odd and four even delayed clock selection signals, S0O–S3O and S0E–S3E, that will be used to select clock pulses in delayed clock pulse generator 230.

Figure 4A:
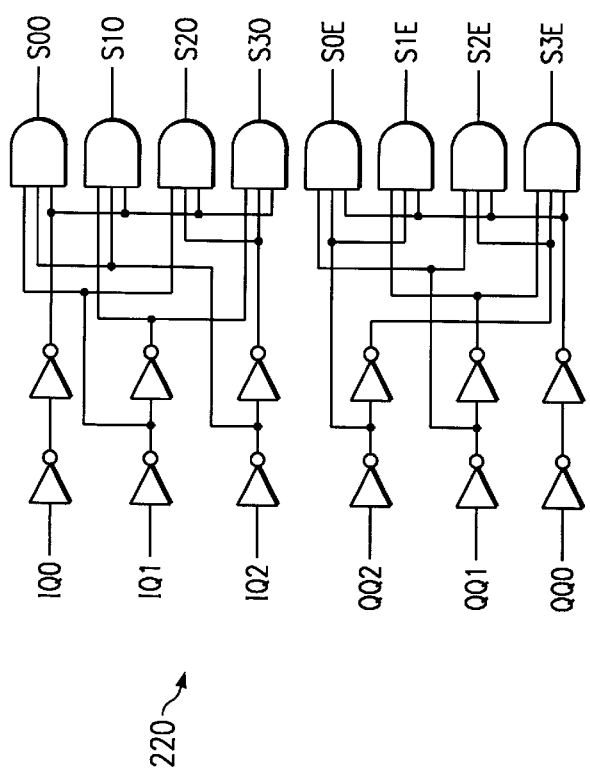
FIG. 4A is a circuit schematic of the delayed clock pulse selector block of FIG. 2.
Figure 4B:
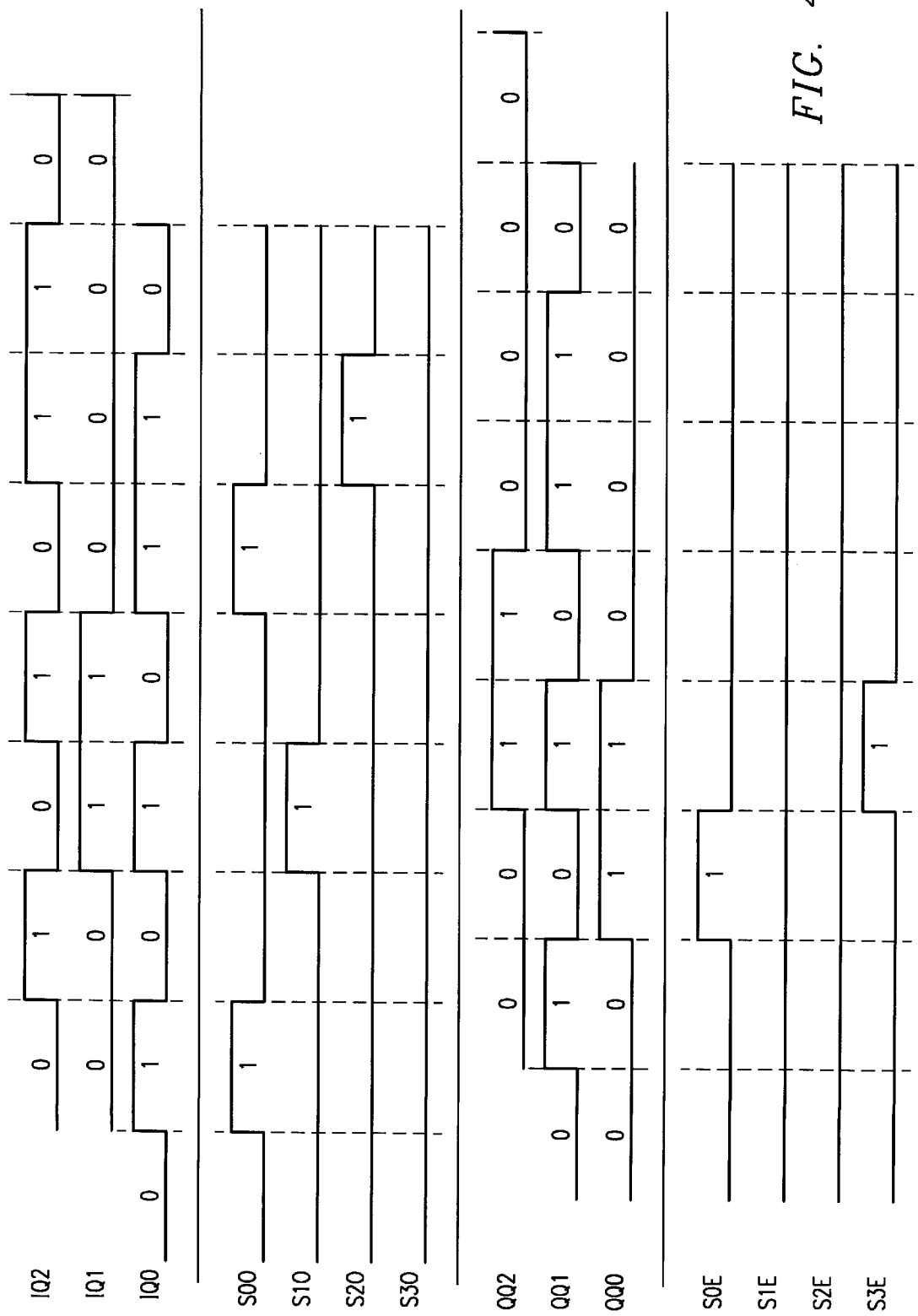
FIG. 4B is a timing diagram of the circuit illustrated in FIG. 4A.

FIG. 4A is a circuit schematic of delayed clock pulse selector 220 and FIG. 4B is a timing diagram of the circuit. As shown in FIG. 4A, delayed clock pulse selector 220 comprises inverters and 3-input AND gates arranged to generate the eight selection sequences. The logic table is as follows:

| IQ2/<br>QQ2 | IQ1/<br>QQ1 | IQ0/<br>QQ0 | S0O/<br>S0E | S1O/<br>S1E | S2O/<br>S2E | S3O/<br>S3E |
|---|---|---|---|---|---|---|
| x | x | 0 | 0 | 0 | 0 | 0 |
| 0 | 0 | 1 | 1 | 0 | 0 | 0 |
| 0 | 1 | 1 | 0 | 1 | 0 | 0 |
| 1 | 0 | 1 | 0 | 0 | 1 | 0 |
| 1 | 1 | 1 | 0 | 0 | 0 | 1 |

Thus, when IQ0=0, none of the odd output sequences is high, and when QQ0=0, none of the even output sequences is high. In such a case, no delayed clock pulse will be selected. If IQ0=1, then one and only one of the four odd output sequences will be high. Likewise, if QQ0=1, then one and only one of the four even output sequences will be high. The selection sequences based on the serial data used in FIG. 3C are illustrated in FIG. 4B.

Ramp Waveform & Threshold Voltage Generator

Ramp waveform & threshold voltage generator 250 uses a current-proportional-to-frequency, $I_{PF}$, and a PECL-level differential master clock to generate odd and even ramp waveforms operating at half the master clock rate. The generator also uses three threshold currents to generate four threshold voltages. The ramp waveforms and the threshold voltages are provided to delayed clock pulse generator 230 to generate the delayed clock signals used to produce precompensation delay.

Figure 5B:
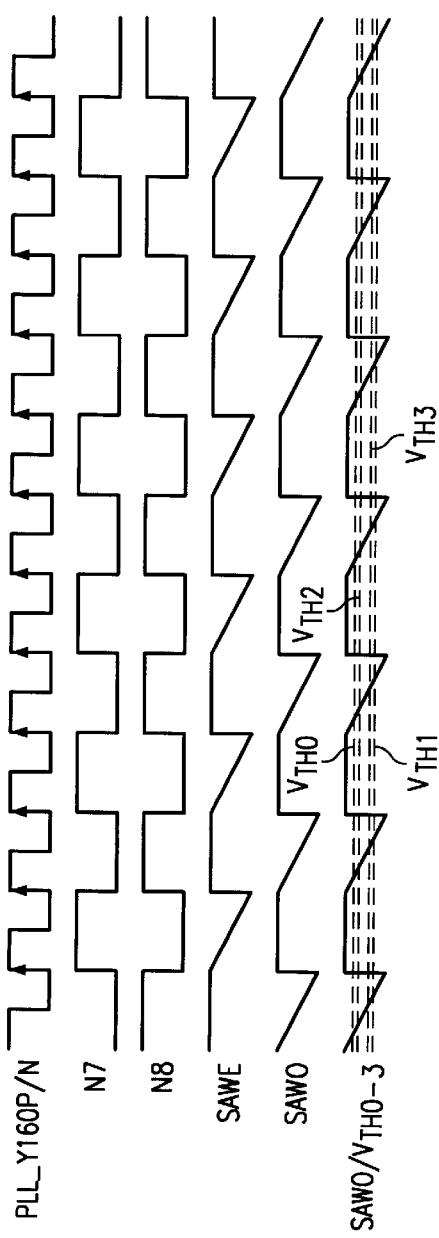
FIG. 5B is a timing diagram of the block illustrated in FIG. 5A.
Figure 5A:
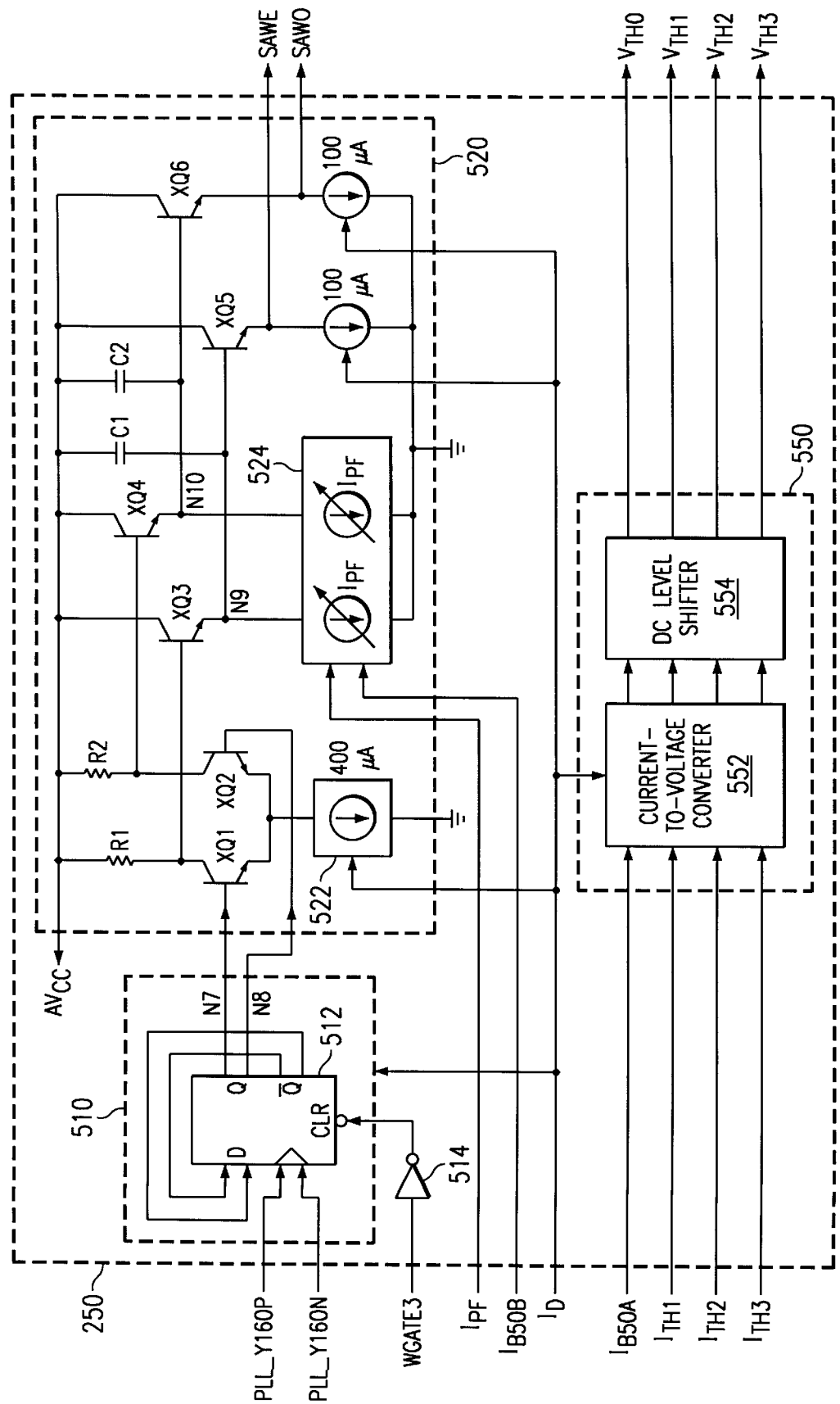
FIG. 5A is a block diagram of the ramp waveform and threshold voltage generator of FIG. 2.

FIG. 5A is a block diagram of ramp waveform & threshold voltage generator 250. There are three main blocks: divider 510 to divide the differential master clock by two into a differential, half-rate derived clock; ramp generator 520 that uses the differential derived clock to generate the odd and even ramp waveforms; and threshold voltage generator 550 to convert the three threshold currents into the four threshold voltages and shift their DC levels appropriately.

Divider 510 includes toggle D-flip flop 512 having as its clock input the PECL-level differential master clock and as its D-input the flip-flop's inverted, half-rate output. The resulting waveforms, N7 and N8, are depicted in FIG. 5B. These are provided to ramp waveform generator 520. Clock N7 should have the same phase as clock N5 from precoder & time-interleaver 210. If not, correct mapping of interleaved precoder outputs to the ramp waveforms is lost. This relationship is key to implementing the interleaved clock scheme to realize more than 50% precompensation. Thus, another input to divider 510, WGATE3, which is generated in power control & reset signal generator 290, is inverted using inverter 514 and provides a reset signal synchronized with WGATE4, which is used to reset the flip-flops in precoder & time-interleaver 210.

Ramp waveform generator 520 is an analog circuit having differential inputs for the differential derived clock from the divider. When derived clock N7 is high, NPN bipolar transistor XQ1 conducts, driving the input to XQ3 low. Because of the presence of C1, N9 does not go low immediately, but ramps down as C1 discharges. SAWE, the even ramp waveform, follows N9 via XQ5, as is shown in FIG. 5B. SAWO, the odd ramp waveform, also shown in FIG. 5B, is complementary to SAWE and starts with derived clock N8 low to XQ2. When clock N8 goes high, XQ2 conducts, the input to XQ4 goes low, causing N10 to ramp down (because of C2), and SAWO follows through XQ6. In one example of circuit values in ramp waveform generator circuit 520, resistors R1 and R2 equal 2.6 ΩQ, and current sink 522 sinks 400 µA through the differential transistor pair producing a 1.04 V signal swing at the outputs of the differential pair. The value of the current through current sink 522 is maintained at 400 µA.

The biasing for ramp waveform generator 520 operates as follows. $I_D$, a 100 A current generated in bias current generator 285, is provided (via current sink 522) to differential transistor pair XQ1/XQ2 and is provided to the output transistors XQ5 and XQ6. $I_D$ is a "proportional-to-resistor" ("PTR") type current which compensates for resistor variations. ($I_D$ also biases divider 510.) Similarly, $I_{B50B}$, a 50 µA current, also generated in bias current generator 285, biases transistors XQ3 and XQ4, using wide-swing current mirror bias circuit 524.

$I_{PF}$, a current that is generated in $I_{PF}$ generator 260, is proportional to the master clock frequency and is provided to transistors XQ3 and XQ4 via current mirror bias circuit 524. The slope of $I_{PF}$ versus frequency is $$1 \,\mu\text{A/MHz} \left( \text{i.e. } \frac{I_{PF}}{f} = 10^{-12} \text{ coulombs} \right),$$

so that if the master clock frequency equals 160 MHz (the maximum for the preferred embodiment), $I_{PF}$ equals 160 µA. Similarly, if the master clock frequency equals 60 MHz (the minimum for the preferred embodiment), $I_{PF}$ equals 60 µA. Generating a current that is proportional to the master clock frequency maintains the peak-to-peak voltage of the SAW waveforms constant, thereby assuring generation of delayed clock signals as constant percentages of the master clock time period. The peak-to-peak voltage of the ramp waveform is governed by the following equation:

$$\Delta V = \frac{I_{PF}}{f} * \frac{1}{C},$$

where C is the capacitance of C1 or C2, and f is the master clock frequency. Thus, if $$C = 1 \, pF, \frac{I_{PF}}{f} = 10^{-12},$$

and $\Delta V = 1V$. In addition, because $V_{BE}$ (XQ3, XQ4) is a function of $I_{PF}$ as governed by the Ebers-Moll equation, $$V_{BE} = V_T \ln \frac{I_C}{I_S},$$

where $I_C = I_{PF}$, $I_S$ is the saturation current, and $V_T$ is the thermal voltage $$\left(\text{i.e.}\frac{kT}{q}\right),$$

and the maximum to minimum ratio of $I_{PF}$ is 160/60, the maximum variation of $$V_{BE} \text{ is } V_T \ln\frac{160}{60} = 0.98\, V_T.$$

Threshold voltage generator 550 takes three threshold currents, $I_{TH1}$, $I_{TH2}$, and $I_{TH3}$, provided from threshold current generator 270, passes them through current-to-voltage converter 552 to generate a series of voltages, which are then passed through DC-level shifter 554 to generate four threshold voltages, $V_{TH0}$, $V_{TH1}$, $V_{TH2}$, and $V_{TH3}$, which are used to generate the delayed clock signals in delayed clock pulse generator 230. As will be explained in more detail in the description of threshold current generator 270, $I_{TH1}$ and $I_{TH3}$ can have values from 0–200 µA, and $I_{TH2}$ can have a value of from 0–50 µA. In threshold voltage generator 550, $V_{TH0}$ is set by a voltage drop across a resistor R, not shown, where the current is 100 µA and the resistor value is 2 kΩ. Thus, $$V_{TH0}=AV_{CC}-IR=4.25-(100\times10^{-6})(2\times10^3)=4.25-0.2=4.05\text{V}.$$

The values of the other threshold voltages are less than or equal to $V_{TH0}$, depending on the value of the corresponding threshold current and the value of a resistor associated with each voltage. Thus, $V_{THx}=V_{TH0}-I_{THx}R$, where "x"=1, 2, or 3. For R=2.5 kΩ, and the values of $I_{THx}$ at their maximums (i.e., 200 µA, 50 µA, and 200 µA, respectively):

$$V_{TH1}=V_{TH3}=4.05-(200\,\mu\text{A})(2.5\text{ k}\Omega)=4.05-0.5=3.55\text{V};$$

$$V_{TH2}=4.05-(50\,\mu\text{A})(2.5\text{ k}\Omega)=4.05-0.125=3.925\text{V}.$$

In the preferred embodiment, $V_{TH1}$ and $V_{TH3}$ are normally not the same—$V_{TH3}$ is normally set a little higher than $V_{TH1}$, by using a lower value of $I_{TH3}$, thus providing a little less precompensation delay. In the case where $I_{TH3}$=150 µA, $$\text{i } V_{TH3}=4.05-(150\,\mu\text{A})(2.5\text{ k}\Omega)=4.05-0.375=3.675\text{V}.$$

These voltages are shown in FIG. 5B superimposed on the SAWO waveform. The peak-to-peak voltage of the SAWO waveform is 1V, and its maximum is $AV_{CC}$=4.25V. Using the values derived above, the difference between $V_{TH0}$ and $V_{TH1}$ is 0.5V, or half the peak-to-peak SAW voltage, and the maximum delay possible due to $V_{TH1}$ is 50%. The difference between $V_{TH0}$ and $V_{TH3}$ is 0.375V, or three-eighths the peak-to-peak SAW voltage, and the maximum delay possible due to $V_{TH3}$ is 37.5%. The difference between $V_{TH0}$ and $V_{TH2}$ is 0.125V, or one-eighth the peak-to-peak SAW voltage, and the maximum delay possible due to $V_{TH2}$ is 12.5%.

If the value of the resistor R is increased to 3.5 kΩ and the same threshold currents are used, the threshold voltages become:

$$V_{TH0}=4.05\text{V};$$

$$V_{TH2}=4.05-(50\,\mu\text{A})(3.5\text{ k}\Omega)=4.05-0.175=3.875\text{V};$$

$$V_{TH3}=4.05-(150\,\mu\text{A})(3.5\text{ k}\Omega)=4.05-0.525=3.525\text{V; and}$$

$$V_{TH1}=4.05-(200\,\mu\text{A})(3.5\text{ k}\Omega)=4.05-0.7=3.35\text{V}.$$

In these cases, the maximum delay possible due to $V_{TH1}$ is 70%, that due to $VTH_3$ is 52.5%, and that due to $V_{TH2}$ is 17.5%. Thus, the invention is capable of providing at least 50% precompensation delay.

Theoretically, precompensation delay could be designed to approach nearly 100%. However, that would push $V_{TH0}$ to the maximum value of the SAW waveform ($AV_{CC}$) and $V_{TH1}$ to the minimum value of the SAW waveform. Having the threshold voltages at these levels does not provide much margin for the SAW waveform or the threshold voltages, and would not be good design practice. Thus, these voltages are designed to lie comfortably within the maximum and minimum values of the SAW waveform. Nevertheless, the delay using the present invention is greater than that of the prior art: the theoretical limit of precompensation delay using the techniques of the prior art is less than 50%, and the practical limit, using good design practice, is closer to 30%.

Threshold Current Generator

The threshold currents are generated in threshold current generator 270 by scaling two currents, $I_{DAC1}$ and $I_{DAC2}$, generated by bias current generator 285, using thirteen digital input lines which set the desired amount of precompensation delay. Preferably, $I_{DAC1}$ and $I_{DAC2}$ are 50 µA, generating $I_{TH1}$ and $I_{TH3}$ that vary from 0–200 µA and $I_{TH2}$ that varies from 0–50 µA, depending on the value of the digital input lines. $I_{DAC1}$ and $I_{DAC2}$ can take on other values, but 50 µA optimzes the overall power consumption in the WPC circuit.

The threshold currents are calculated approximately as follows:

$$I_{TH1} = I_{DAC1}[2*DEL14 + DEL13] +$$
$$\frac{I_{DAC2}}{8}[4*DEL12 + 2*DEL11 + DEL10]$$

$$I_{TH2} = \frac{I_{DAC2}}{8}[4*DEL22 + 2*DEL21 + DEL20]$$

$$I_{TH3} = I_{DAC1}[2*DEL34 + DEL33] +$$
$$\frac{I_{DAC2}}{8}[4*DEL32 + 2*DEL31 + DEL30]$$

Figure 6:
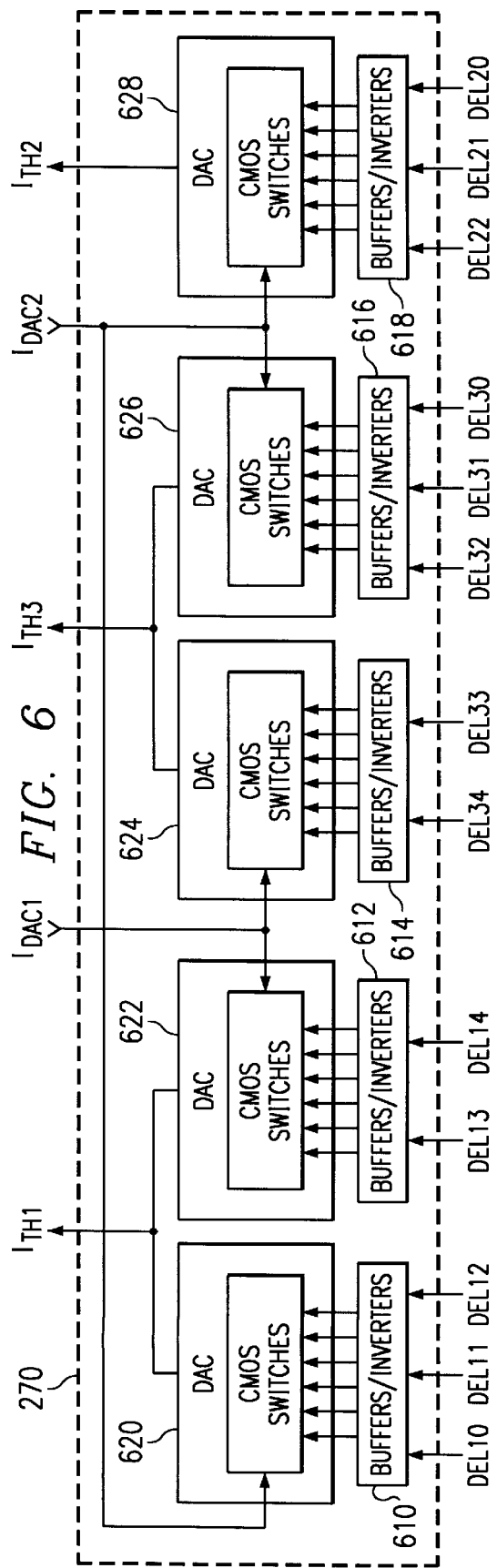
FIG. 6 is a block diagram of the threshold current generator of FIG. 2.

FIG. 6 is a block diagram of threshold current generator 270. Shown are the thirteen digital inputs, DEL10–DEL14, DEL20–DEL22, and DEL30–DEL34. Each set of DEL inputs is provided to CMOS buffers and inverters and from there to a digital-to-analog converter (DAC) consisting of CMOS switches and transistor circuitry. In generating $I_{TH1}$, DEL13 and DEL 14 are provided to buffer 612 to output six lines to DAC 622. Buffer 612 includes inverters, an AND gate, and an OR gate. DAC 622 includes CMOS switches and transistors that scale $I_{DAC1}$ appropriately. DEL10, DEL11, and DEL12 are provided to buffer 610, which includes inverters, and six lines are provided to DAC 620. The outputs of DACs 620 and 622 are combined to form $I_{TH1}$. $I_{TH3}$ is generated in the same way as $I_{TH1}$, providing DEL33 and DEL34 to buffer 614 and then to DAC 624, where the inputs scale $I_{DAC1}$, providing DEL30, DEL31, and DEL32 to buffer 616 and then to DAC 626, where the inputs scale $I_{DAC2}$, and combining the outputs of DACs 624 and 626. $I_{TH2}$ is generated in the same way as the portion of $I_{TH3}$ having three inputs. DEL20, DEL21, and DEL22 are provided to buffer 618, and six lines are provided to DAC 628 that scale $I_{DAC2}$ appropriately. The output of DAC 628 is $I_{TH2}$.

$I_{PF}$ Generator

The $I_{PF}$ current is set by using a combination of four RANGE bits and three TRIM bits to scale external current WPC_IEXT. Preferably, WPC_IEXT is 25 μA and generates an $I_{PF}$ that varies from 60–160 μA. The $I_{PF}$ current is calculated as follows:

$$I_{PF3/4} = \frac{WPC\_IEXT}{5}[9 + RANGE0 + 2*RANGE1 + 4*RANGE2 + 8*RANGE3]$$

$$I_{PF} = \frac{I_{PF3/4}}{12}[12 + TRIM0 + 2*TRIM1 + 4*(1 - TRIM2)]$$

Figure 7:
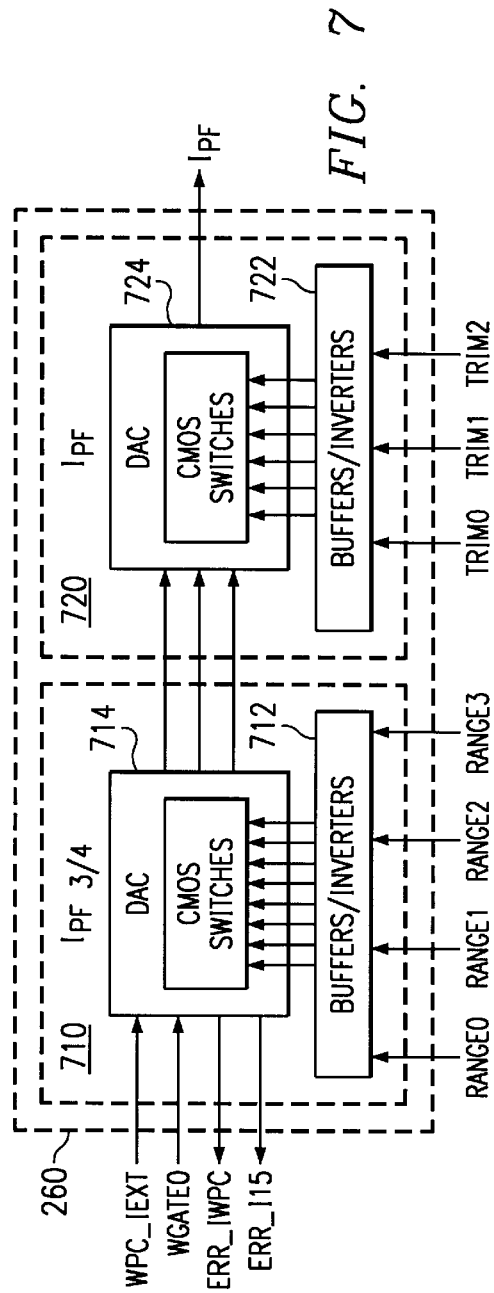
FIG. 7 is a block diagram of the $I_{PF}$ generator of FIG. 2.

FIG. 7 is a block diagram of $I_{PF}$ generator 260. Shown are the seven digital inputs, RANGE0–RANGE3 and TRIM0–TRIM2. Just as in threshold current generator 270, each set of digital inputs is provided to CMOS buffers and inverters and from there to a DAC consisting of CMOS switches and transistor circuitry. The RANGE bits provide 75% of $I_{PF}$ and the TRIM bits provide the remaining 25% of $I_{PF}$. The RANGE bits provide a current proportional to the master clock frequency, as described in the discussion of ramp waveform & threshold voltage generator 250. The TRIM bits trim the bias current to compensate the capacitor tolerance of capacitors C1 and C2 used in ramp waveform & threshold voltage generator 250. As discussed previously, the slope of $I_{PF}$ versus frequency is nominally 1 μA/MHz and the peak-to-peak voltage of the SAW waveforms $$\Delta V = \frac{I_{PF}}{f} * \frac{1}{C}.$$

For C=1 pF, ΔV=1V. However, if C were to vary from its nominal value, the TRIM bits would be used to vary the value of $I_{PF}$ in order to maintain ΔV=1V. For example, if the master clock frequency is 120 MHz, the desired value for $I_{PF}$ is 120 μ. However, if C were only 0.9 PF, ΔV would equal 1.11V. To make ΔV=1V, $I_{PF}$ would have to be adjusted to 108 μA. The TRIM bits allow for departures from nominal value of from −25% to +18.75%.

The RANGE bits form a binary number and the TRIM bits form a "twos complement" number. If all the RANGE and TRIM bits are 0, $I_{PF\,3/4}$ section 710 provides 45 μA and $I_{PF}$ section 720 provides the remaining 15 μA to total 60 μA, based on the minimum master clock frequency for the preferred embodiment. If all the RANGE bits are 1 and the TRIM bits are 0, $I_{PF\,3/4}$ section 710 provides 120 μA and $I_{PF}$ section 720 provides the remaining 40 μA to total 160 μA, based on the maximum master clock frequency for the preferred embodiment. Because of the TRIM capability, the range of currents able to be supplied is from 45 μA to 190 μA.

In generating $I_{PF\,3/4}$, RANGE0–RANGE3 are provided to buffer 712 to output eight lines to DAC 714. Buffer 712 includes inverters and outputs the inverted and non-inverted RANGE bits. DAC 714 includes CMOS switches and transistors that scale WPC_IEXT appropriately. The output of $I_{PF\,3/4}$ section 710 is provided to $I_{PF}$ section 720. TRIM0, TRIM1, and TRIM2 are provided to buffer 722, which also includes inverters, and six lines are provided to DAC 724 which scales $I_{PF\,3/4}$ appropriately and trims the current to compensate for departure of capacitance from its nominal value.

$I_{PF\,3/4}$ section 710 also generates two signals that it provides to an error block, not shown. This error block is used for monitoring the WPC circuit. The two signals are ERR_IWPC and ERR_I15. ERR_IWPC is a current equal to approximately $I_{PF}/10$ and has values between 5.625 μA and 15 μA in increments of 0.625 μA. ERR_I15 is a constant current of 15 μA.

In addition, WGATE0, a signal from power control & reset signal generator 290, is provided to $I_{PF}$ generator 260. WGATE0 is the main power control, which, if high, turns off $I_{PF}$ generator 260, places the WPC circuit in low-power mode, and powers down the entire WPC circuit. In normal operation, therefore, WGATE0 is low.

Delayed Clock Pulse Generator

Delayed clock pulse generator 230 takes the eight pulse selection lines, S0O–S3O and S0E–S3E, from delayed clock pulse selector 220 and the odd and even ramp waveforms and the four threshold voltages from ramp waveform & threshold voltage generator 250, generates odd and even versions of four delayed clocks, CLK0–CLK3, and generates odd and even RZ sequences of pulses based on the pulse selection lines. The complementary RZ sequences are provided to NRZ modulator 240.

First, the threshold voltages are compared to the SAW waveforms to generate the eight delayed clock signals at the derived clock rate (half the master clock rate)—four even-phase clocks, CLK0E–CLK3E, and four odd-phase clocks, CLK0O–CLK3O. In the circuit implementation of the preferred embodiment, the comparators have differential outputs, thus generating a delayed clock signal and its complement. The duty cycles and the "on" times (the time in each period when the clock goes "high") of the delayed clocks differ according to the threshold voltage (see FIGS. 8B and 8C). As discussed previously in the ramp waveform and threshold voltage generator section, $V_{TH0}$ is set 0.2V below the maximum SAW voltage, $V_{TH1}$ or $V_{TH3}$ can be set 0.5V lower than $V_{TH0}$ for 50% precompensation (based on the SAW peak-to-peak voltage of 1V), or those voltages can be set more than 0.5V lower than $V_{TH0}$ if more than 50% precompensation is desired, and $VTH_2$ can be set 0.125V (or more) below $V_{TH0}$ to provide 12.5% or more precompensation. As pictured in FIGS. 8B and 8C, $V_{TH1}$ provides 50% precompensation, $V_{TH2}$ provides 12.5% precompensation, and $V_{TH3}$ provides 37.5% precompensation (by definition, $V_{TH0}$ provides 0% precompensation).

Next, a multiplexor uses the S0O–S3O sequences as switches on the four odd delayed clock signals and the S0E–S3E sequences as switches on the four even delayed clock signals. For each period of the respective odd or even derived (half-rate) clocks, either zero or one of the four delayed clocks will be selected. Delayed clock pulse generator 230 then provides to NRZ modulator 240 the even sequence (RZEP) and its complement (RZEN) and the odd sequence (RZOP) and its complement (RZON).

Figure 8A:
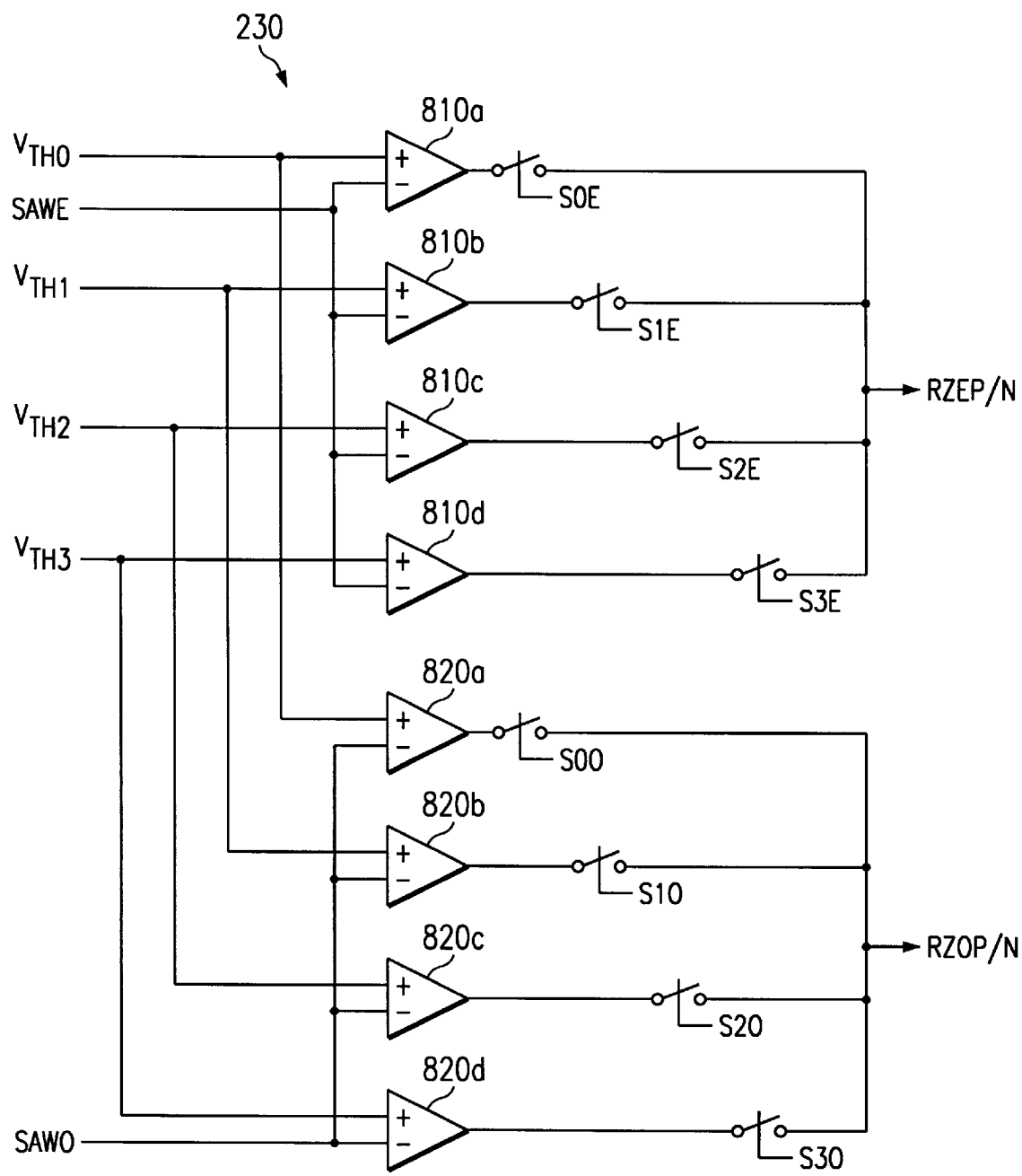
FIG. 8A is a schematic diagram of the delayed clock pulse generator of FIG. 2.
Figure 8B:
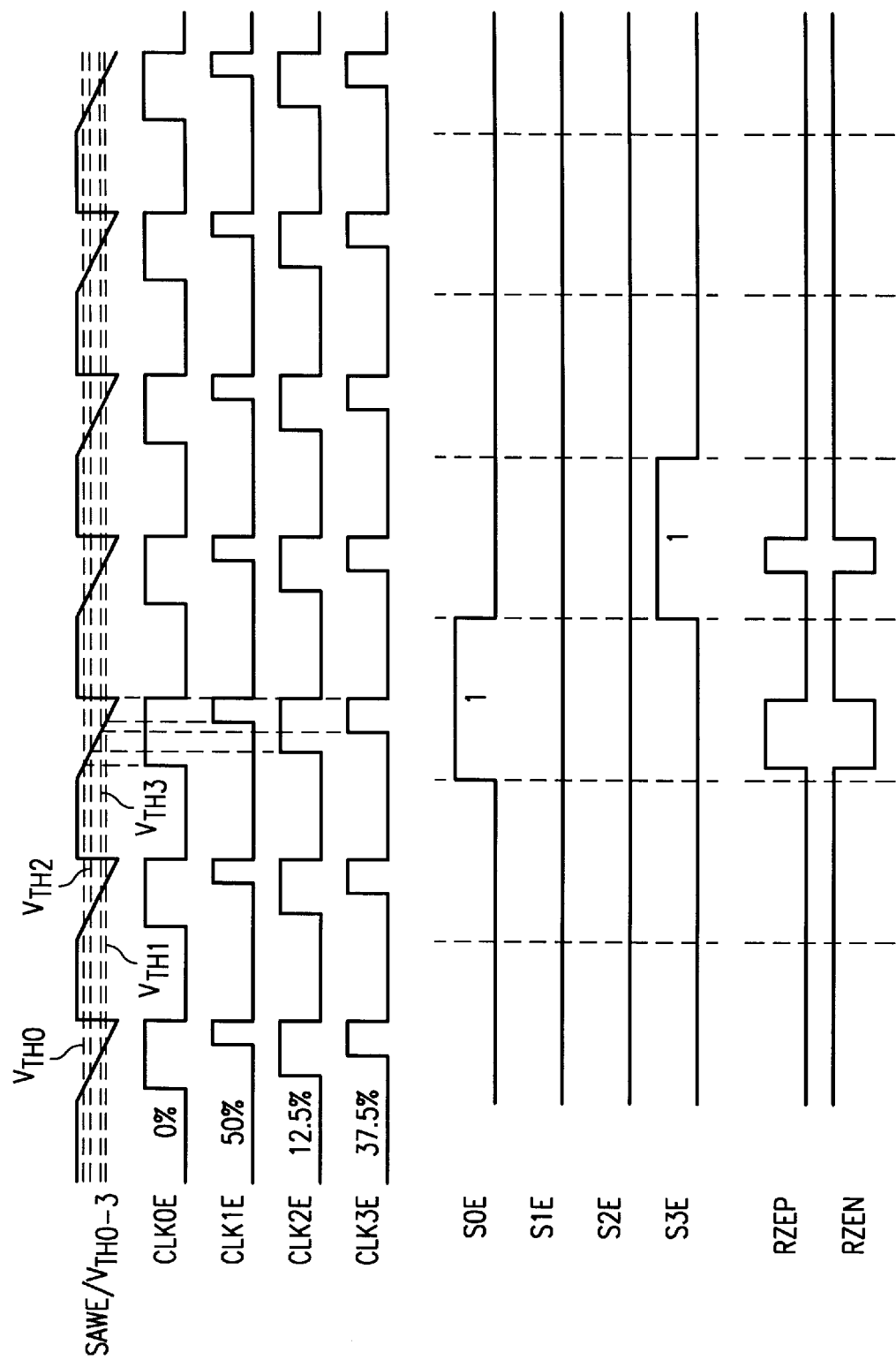
FIGS. 8B and 8C are timing diagrams of the even and odd sequences, respectively, of the delayed clock pulse generator illustrated in FIG. 8A.
Figure 8C:
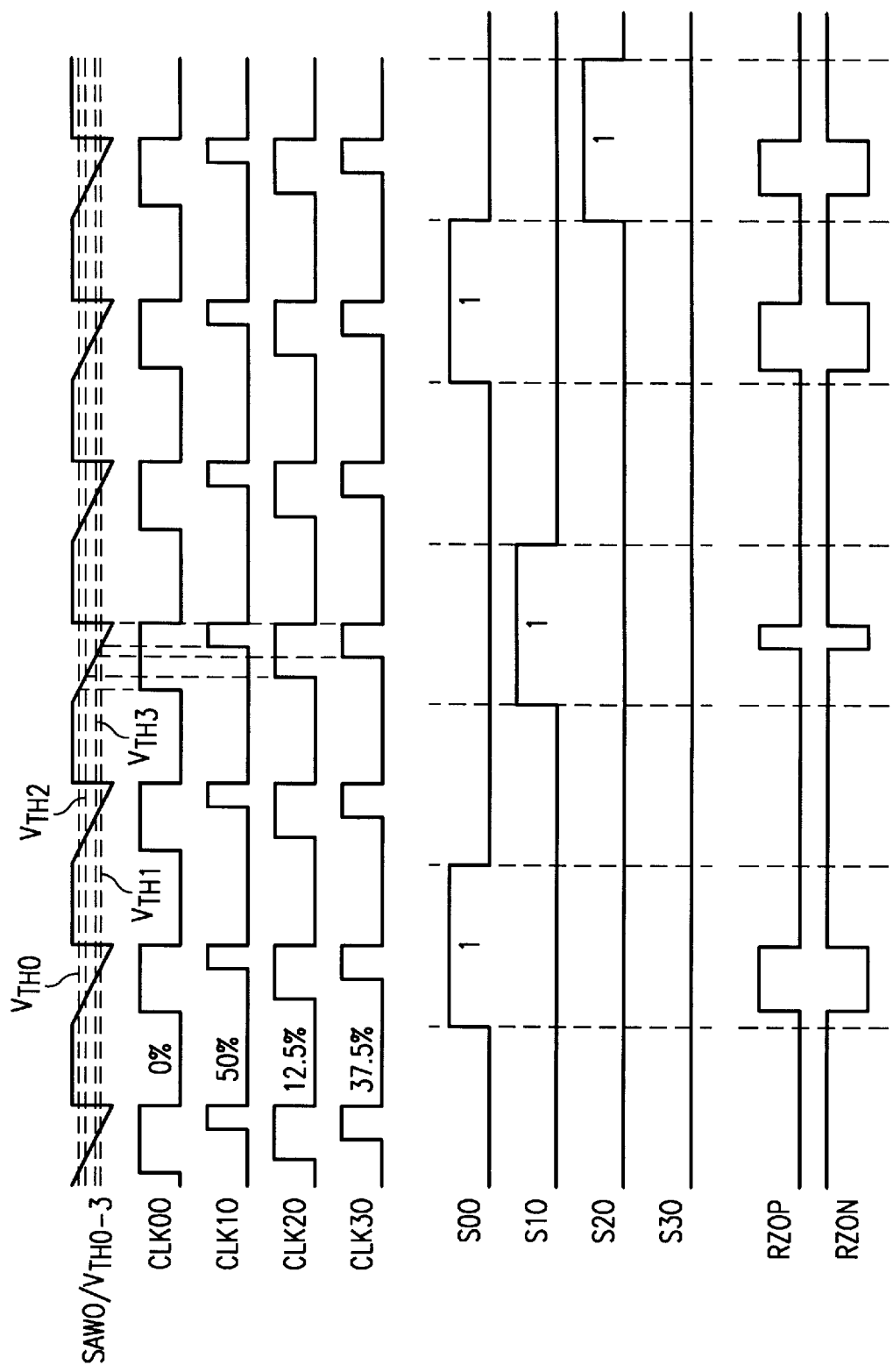

These functions are shown schematically in FIGS. 8A–8C. FIG. 8A is a schematic diagram of delayed clock pulse generator 230. There are eight comparators, four for even signals, 810a–810d, and four for odd signals, 820a–820d. SAWE is provided to the inverting input of even comparators 810a–810d, and the four threshold voltages are respectively provided to the non-inverting inputs of those comparators. Similarly, SAWO is provided to the inverting input of odd comparators 820a–820d, and the four threshold voltages are respectively provided to the non-inverting inputs of those comparators. The output of the comparators is high when $V_{THx}$>SAW voltage and low otherwise. Thus, when the SAW waveforms are high, the comparator outputs are low. When the SAW waveforms begin to ramp downward, the comparator outputs go high at different times based on the threshold voltages a higher threshold voltage generates a longer "on" time and higher duty cycle. Each set of four comparator outputs simultaneously goes low at the end of the respective SAW period (when the ramp ends). The respective duty cycles of CLK0–CLK3 shown in FIGS. 8B and 8C are 40%, 15%, 33.75%, and 21.25%, respectively.

The selection sequences operate as part of two four-to-one multiplexors. When none of the selection sequences is high, no delayed clock pulse is provided to the output, and the RZ sequence is low throughout that clock period. When S0E is high, the output from comparator 810a comparing $V_{TH0}$ and SAWE is provided to the output, i.e., a delayed clock pulse from CLK0E. When S1E is high, the output from comparator 810b comparing $V_{TH1}$ and SAWE is provided to the output, i.e., a delayed clock pulse from CLK1E. S2E and S3E operate analogously, providing either the delayed clock pulse from CLK2E or the delayed clock pulse from CLK3E, respectively, if those selection signals are high. S0O–S3O operate analogously in selecting CLK0O–CLK3O to generate the odd RZ waveforms.

Pictured in FIGS. 8B and 8C are timing diagrams for the even and odd RZ waveforms produced by delayed clock pulse generator 230. The clock selection sequences, S0E–S3E and S0O–S3O, are the same as those pictured in FIG. 4B and are derived from the current precoded data bit and the preceding two precoded data bits. In FIG. 8B, S0E is high during one derived (half-master-clock-rate) clock period. For that clock period, CLK0E is output to the even RZ sequence. Similarly, S3E is high during one derived clock period, and for that clock period, CLK3E is output to the even RZ sequence. For all of the other clock periods pictured, none of the selection signals is high and therefore the even RZ sequence remains low. In FIG. 8C, S0O is high during two derived clock periods, and CLK0O is output to the odd RZ sequence during those clock periods. S1O is high during one derived clock period, and CLK1O is output to the odd RZ sequence. Finally, S2O is high during one derived clock period, and CLK2O is therefore output to the odd RZ sequence. For all of the other clock periods pictured, none of the selection signals is high and therefore the odd RZ sequence remains low. As mentioned above, comparators 810a–810d and 820a–820d generate differential delayed clock signals, the complements of which are not pictured. Thus, when the pulse selection lines select the delayed clock pulse, both the RZ sequence and its complement are generated.

As shown in FIG. 2, $I_B$, a current from bias current generator 285, is provided to delayed clock pulse generator 230. $I_B$ is typically 100 μA and is used in delayed clock pulse generator 230 to bias the multiplexor circuitry.

NRZ Modulator

NRZ modulator 240 adds the two positive RZ sequences together and the two complementary RZ sequences together and uses the combined positive RZ sequence to clock a toggle flip-flop to convert the RZ data to NRZ data (and its complement). The resulting waveforms are pictured in FIG. 9B. The waveforms are provided to NRZ modulator 240 at X-level (one $V_{BE}$ drop below the $AV_{CC}$ supply voltage (4.25V)), are added together, and are then level-shifted to Y-level (one $V_{BE}$ drop below X-level) before being provided to a toggle flip-flop. The toggle flip-flop operates the same as that in ramp waveform & threshold voltage generator 250. The complementary outputs of the toggle flip-flop, DATP and DATN, are then provided to output pin driver 280. (Although DATP and DATN are NRZ versions of the RZ input waveforms, DATP and DATN are "NRZI" (non-return-to-zero inverted) transforms of the WPC serial input data.)

Figure 9A:
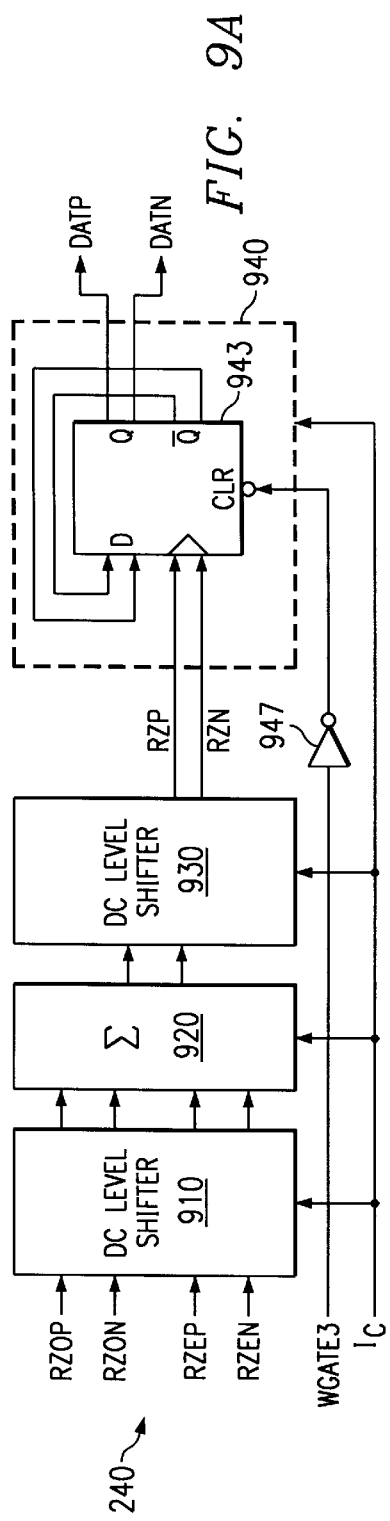
FIG. 9A is a block diagram of the NRZ modulator of FIG. 2.
Figure 9B:
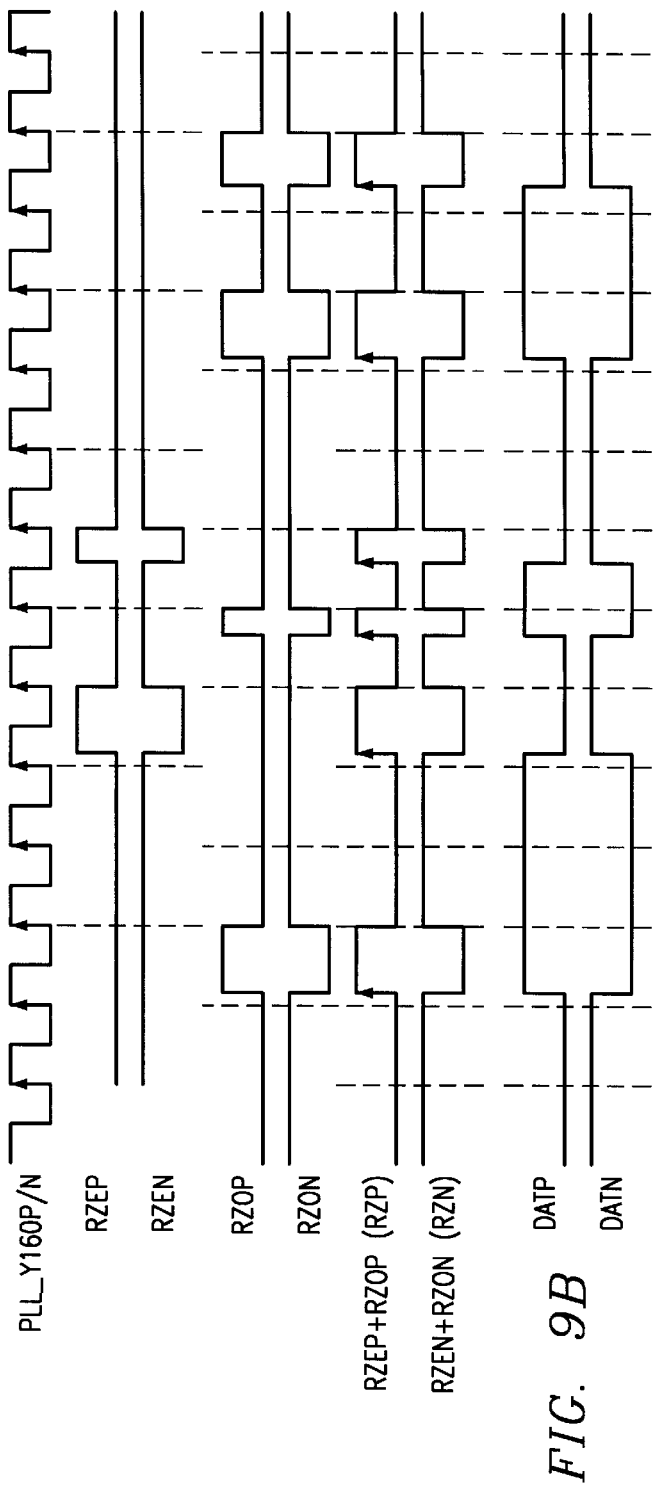
FIG. 9B is a timing diagram of the block illustrated in FIG. 9A.

FIG. 9A is a block diagram of NRZ modulator 240 and FIG. 9B is a timing diagram of the modulator. NRZ modulator 240 includes DC-level shifter 910, summer 920, DC-level shifter 930, and NRZ generator 940, which includes PECL toggle flip-flop 943. Delayed clock pulse generator 230 provides RZEP, RZEN, RZOP, and RZON to DC-level shifter 910 which, using emitter-followers, shifts the DC-level of the signals from X-level to Y-level (less one $V_{BE}$ drop). These signals are then combined in summer 920—RZOP is combined with RZEP and RZON is combined with RZOP—to form one positive and one complementary sequence. These sequences are provided to DC-level shifter 930 to again shift the DC-level from X-level to Y-level to generate RZP and RZN. From there, RZP and RZN are provided as a differential clock to toggle flip-flop 943. Toggle flip-flop 943 operates just as toggle flip-flop 512 operated in ramp waveform & threshold voltage generator 250. The complementary output from the toggle flip-flop is fed back to the D-input of the toggle flip-flop. The NRZ signals, DATP and DATN, are the non-inverting output of the toggle flip-flop. Additionally, just as in ramp waveform & threshold voltage generator 250, WGATE3, from power control & reset signal generator 290, is inverted using inverter 947 and provides a reset signal for toggle flip-flop 943. WGATE3 is synchronized with WGATE4, which is used to reset the flip-flops in precoder & time-interleaver 210. An additional input to NRZ modulator 240 is bias current $I_C$. $I_C$ is generated in bias current generator 285 and is provided to each of the modules of NRZ modulator 240. Like $I_B$ used in delayed clock pulse generator 230, and $I_D$, used in ramp waveform & threshold voltage generator 250, $I_C$ is typically 100 μA.

Output Pin Driver

Output pin driver 280 takes the positive and negative NRZ sequences (DATP and DATN) from NRZ modulator 240 and provides proper signal swing and interfacing to the rest of the HDD circuit. One stage of the output pin driver 280 shifts the DC level from X-level to Y-level and provides adequate signal swing. Another stage controls the output of the WPC circuit if the circuit is in standby mode.

Figure 10:
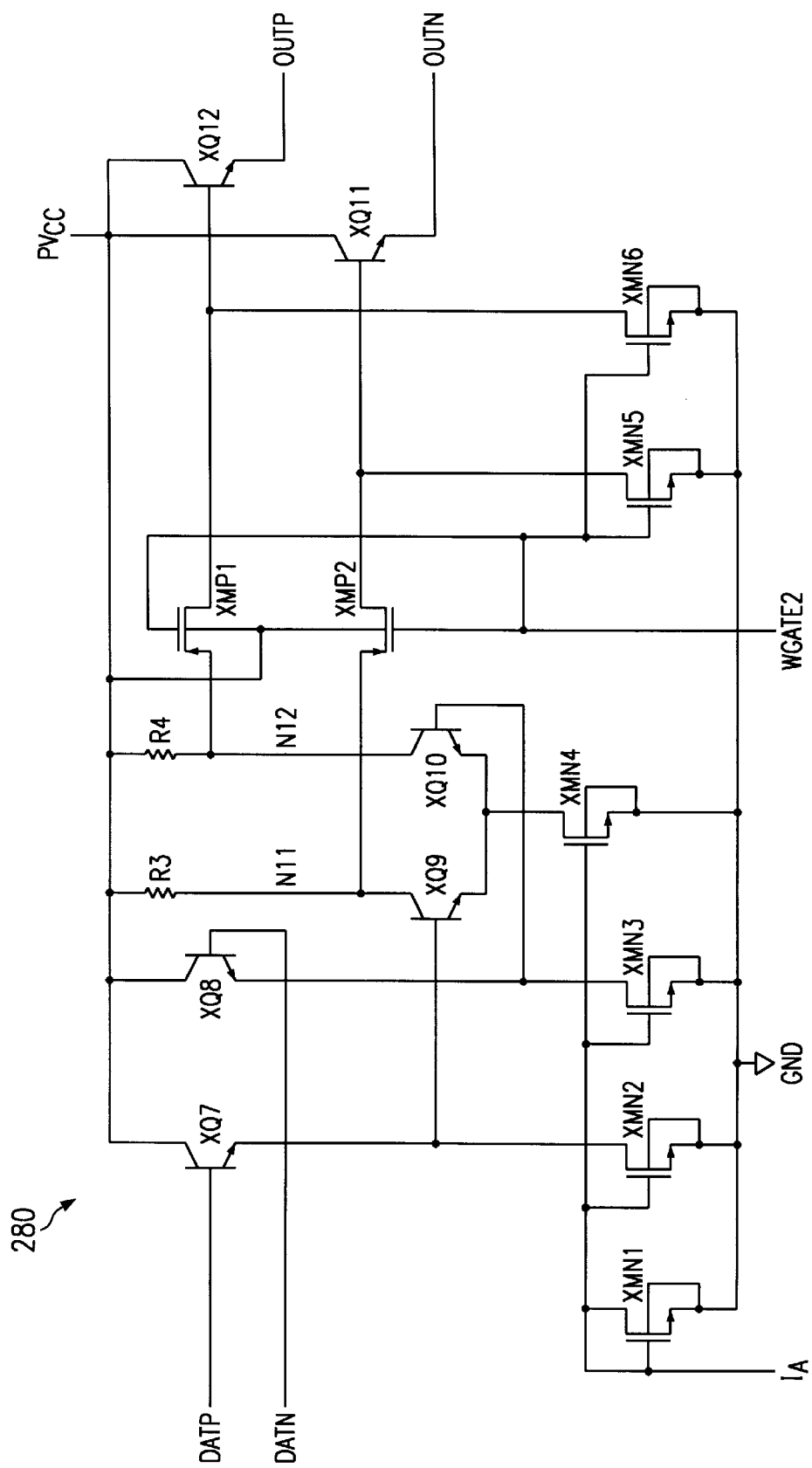
FIG. 10 is a circuit schematic of the output pin driver block of FIG. 2.

FIG. 10 is a circuit schematic of output pin driver 280. The block is powered by the high power $PV_{CC}$ 5V supply. The input differential stage comprises transistors XQ7 and XQ8, which shift the X-level inputs DATP and DATN to the Y-level in order to secure adequate output signal swings at N11 and N12. Bias current $I_A$ from bias current generator 285 is typically 100 μA. Using nMOS enhancement-mode transistors XMN1, XMN2, and XMN3, the bias currents for XQ7 and XQ8 are 400 μA and provide sufficiently fast transitions at high clock frequencies. The bias current through WMN4 and the next differential stage made of XQ9 and XQ10 is 1.6 mA. For values of R3 and R4 of 750Ω, the voltage swing across the resistors is 0.75 kΩ×1.6 mA=1.2V. PMOS enhancement-mode transistors XMT1 and XMP2 and nMOS transistors XM5 and XM6 control the output. During standby mode, WGATE2, which is generated in power control & reset signal generator 290, is high, cutting off XMP1 and XMP2, causing the output currents to flow into ground through XMN5 and XMN6. During normal operation, WGATE2 is low, cutting off XMN5 and XMN6, and allowing XMP1 and XMP2 to conduct through to output transistors XQ11 and XQ12, which outputs OUTN and OUTP, respectively. These transistors are the main pin driving devices which should be capable of providing a maximum current of about 10 mA. These two devices require guard rings around them, and they also require a finger strip emitter and base structure to reduce the base resistance.

Power Control & Reset Signal Generator

Power control & reset signal generator 290 provides signals to other blocks in the WPC controlling the WPC while in normal, standby, or low-power mode, and synchronizing precoder & time-interleaver 210, ramp waveform & threshold voltage generator 250, and NRZ modulator 240. The inputs to power control & reset signal generator 290 are the CMOS-level master clock PLL__160C, a 40 MHz reference clock REF_CLK, generated using a crystal clock generator, a gating signal WR__GATE, and two power mode control signals, WPC__PWR and REF__LPZ.

Power control & reset signal generator 290 outputs five control signals, WGATE0–WGATE4. WGATE0 is the main power control for the WPC circuit and is an inverted signal of REF__LPZ. If REF__LPZ is low, then WGATE0 is high and turns off bias current generator 285 and $I_{PF}$ generator 260, shutting down all of the blocks in the WPC circuit. WGATE1 and WGATE2 are equivalent to each other and are inverted signals of WPC__PWR. If WPC__PWR is low, then WGATE1 and WGATE2 are high, placing the WPC circuit in standby mode. In that mode, all of the blocks are shut down except for bias current generator 285, through which nominal bias currents of 675 $\mu$A flow into ground and total power consumption is 4.2 mW worst-case. WGATE1 places bias current generator 285 in standby mode, and WGATE2 controls the WPC outputs from output pin driver 280 when the WPC circuit is in standby mode. The WPC circuit operates normally when both REF__LPZ and WPC__PWR are high.

WGATE3 and WGATE4 are equivalent to each other and are inverted signals of WR__GATE after a delay. WR__GATE being high defines a data-writing period; when WR__GATE is low, WGATE3 and WGATE4 are high. While high, WGATE3 resets the PECL flip-flops in ramp waveform & threshold voltage generator 250 and NRZ modulator 240, and WGATE4 resets the CMOS flip-flops in precoder & time-interleaver 210.

Figure 11A:
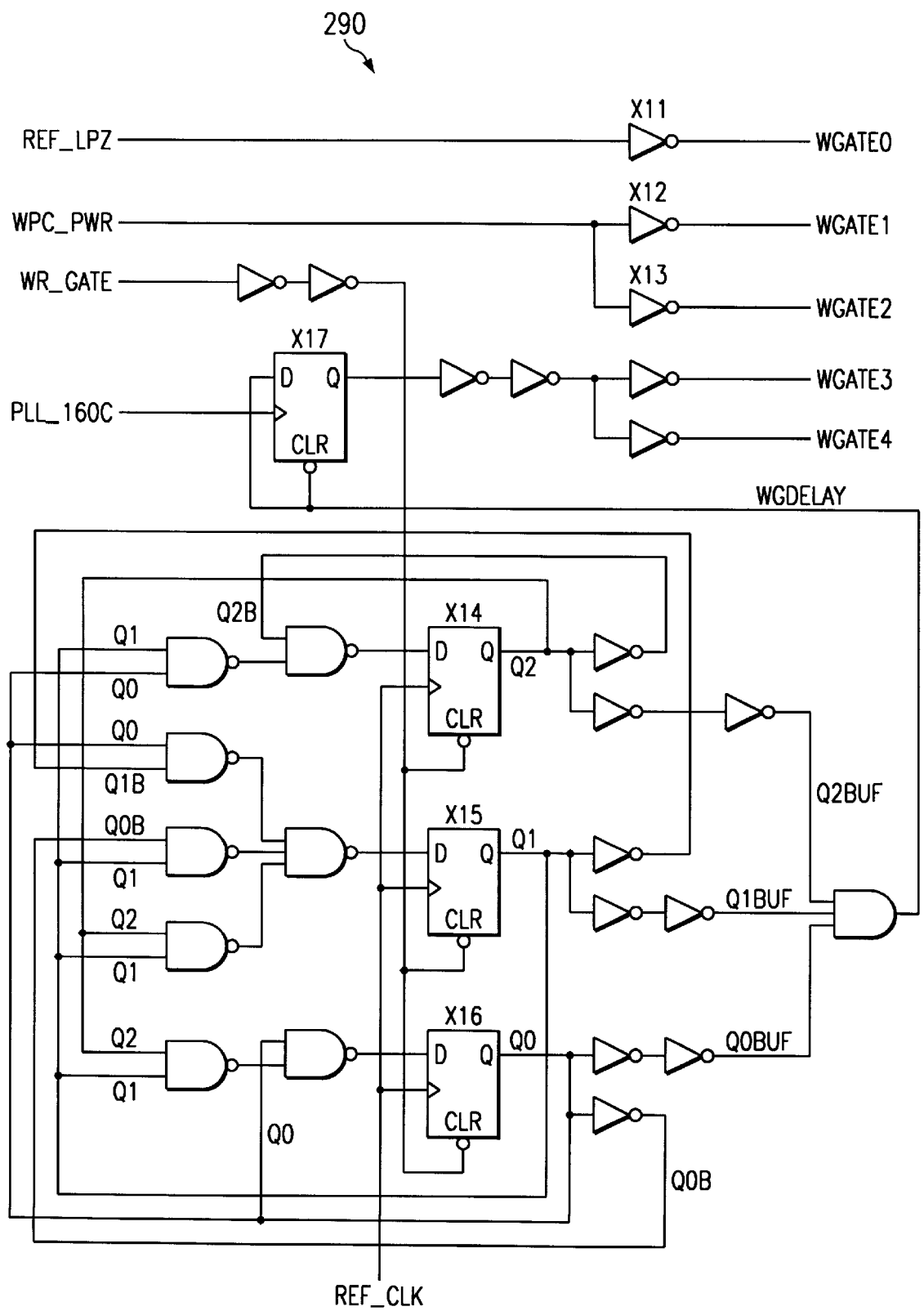
FIG. 11A is a circuit schematic of the power control and reset signal generator of FIG. 2.
Figure 11B:
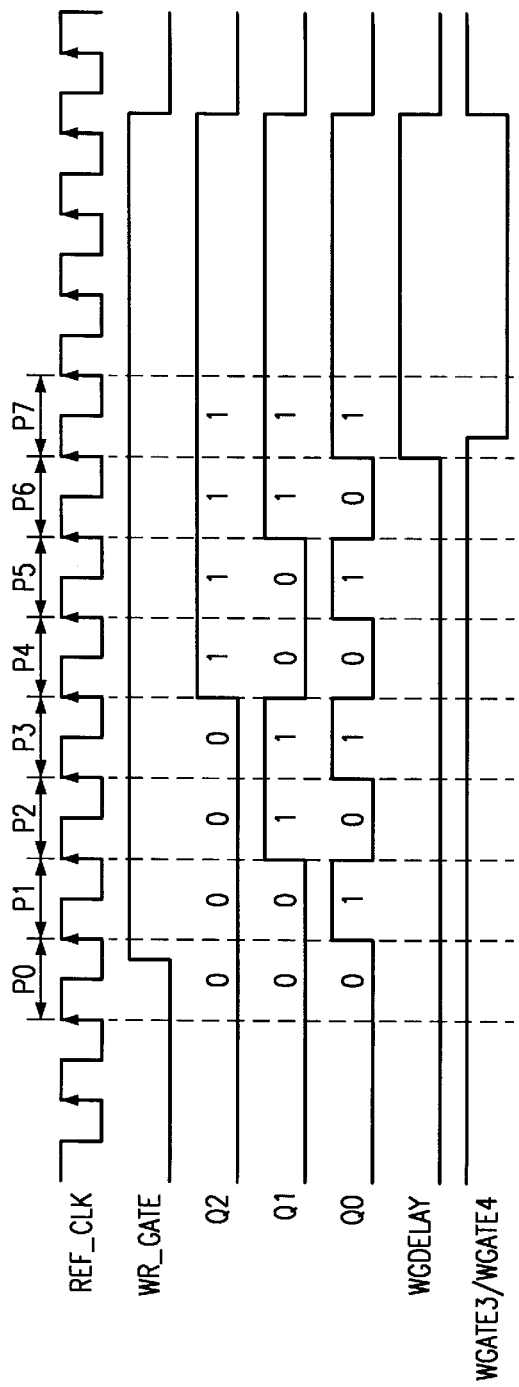
FIGS. 11B and 11C are timing diagrams of some of the signals provided by the circuit illustrated in FIG. 11A.
Figure 11C:
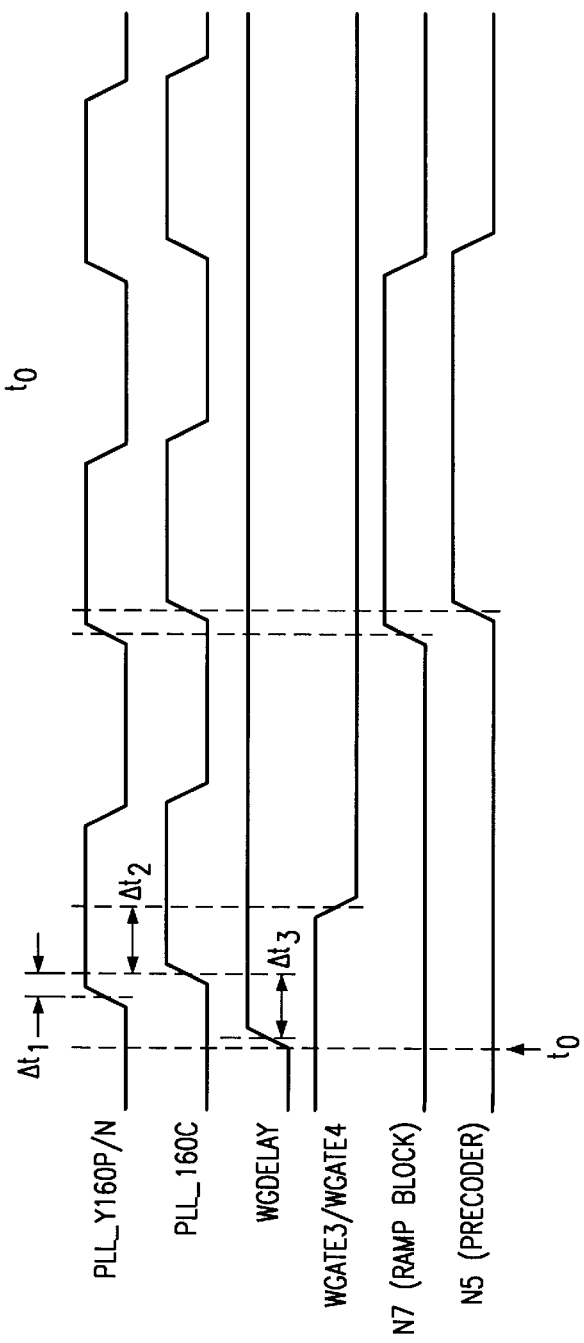

FIG. 11A is a circuit schematic of power control & reset signal generator 290, FIG. 11B is a timing diagram of some of the signals provided by this circuit, and FIG. 11C is a magnified version of some signals from the latter portion of FIG. 11B. REF__LPZ is provided to inverter X11 to generate WGATE0. WPC__PWR is provided to inverters X12 and X13 to provide WGATE1 and WGATE2, respectively. When WR__GATE is low, flip-flops X14, X15, and X16 are in RESET mode, forcing WGDELAY low which RESETS X17 and causes WGATE3 and WGATE4 to go high. When WGATE3 and WGATE4 are high, the outputs of the precoder go low, and the complementary ramp waveform outputs and NRZ modulator outputs are pinned either high or low, because the flip-flops in those blocks are all in RESET mode. When WR__GATE goes high, flip-flops X14, X15, and X16 begin to operate and a delay generator made up of the bottom portion of FIG. 11A begins cycling. This delay generator has eight states S0–S7 based on the values of Q2, Q1, and Q0. When WR__GATE is low and flip-flops X14, X15, and X16 are RESET, Q2, Q1, and Q0 are all low. That is state S0. Once WR__GATE goes high, within time period P0, these three outputs change state every clock period P1–P7 of REF_CLK. WGDELAY, whose logic equation is Q2·Q1·Q0, and which controls WGATE3 and WGATE4, remains low until all three outputs are high (state S7). The state table is as follows:

| (N−1)th period | | | | Nth period | | | |
|---|---|---|---|---|---|---|---|
| State | Q2 | Q1 | Q0 | State | Q2 | Q1 | Q0 |
| S0 | 0 | 0 | 0 | S1 | 0 | 0 | 1 |
| S1 | 0 | 0 | 1 | S2 | 0 | 1 | 0 |
| S2 | 0 | 1 | 0 | S3 | 0 | 1 | 1 |
| S3 | 0 | 1 | 1 | S4 | 1 | 0 | 0 |
| S4 | 1 | 0 | 0 | S5 | 1 | 0 | 1 |
| S5 | 1 | 0 | 1 | S6 | 1 | 1 | 0 |
| S6 | 1 | 1 | 0 | S7 | 1 | 1 | 1 |
| S7 | 1 | 1 | 1 | S7 | 1 | 1 | 1 |

The state table is implemented using the following Boolean logic functions:

$Q2 = Q2 + Q1 \cdot Q0$ $Q1 = \overline{Q1} \cdot Q0 + Q1 \cdot \overline{Q0} + Q2 \cdot Q1$ $Q0 = \overline{Q0} + Q2 \cdot Q1$ Thus, the delay circuit runs through seven states, starting at 000, then proceeding to 001, 010, 011, 100, 101, 110, and 111. Because REF_CLK=40 MHz, each state lasts 25 ns. At state S7, WGDELAY goes high and is clocked though flip-flop X17 by PLL__160C (which has a frequency of from 60 MHz to 160 MHz) to render WGATE3 and WGATE4 low (after several inverter gate delays).

The total amount of delay from the time WR__GATE goes high until WGDELAY goes high is 150 ns for time periods P1–P6 (each is 25 ns) plus the contribution to the delay from time period P0, which depends on when during that time period WR__GATE goes high. If WR__GATE goes high near the beginning of the time period, the delay can be nearly 25 ns; if near the end, the delay can be less than 5 ns. Thus, the total delay from WR__GATE high to WGDELAY high is between 150 ns and 175 ns.

FIG. 11C illustrates the relationship between WGDELAY, WGATE3 and WGATE4, the master clocks, and the derived clocks in the precoder block and ramp waveform generator blocks. The time axis for FIG. 11C is amplified beginning just before time t0, the beginning of time period P7, which is referenced in FIG. 11B. The time between when WGDELAY goes low and CMOS-level master clock PLL__160C goes high, $\Delta t_3$, should be less than the period of PLL__160C. If PLL__160C is at its minimum, 60 MHz, $\Delta t_3$ should be less than 16.7 ns. If PLL__160C is at its maximum, 160 MHz, $\Delta t_3$ should be less than 6.25 ns. In either case, $\Delta t_3$ can be as little as 0 ns. After PLL__160C goes high, it clocks WGDELAY through flip-flop X17, and WGATE3 and WGATE4 go low after time $\Delta t_2$, which equals the delay through flip-flop X17 plus three inverter gate delays.

PECL-level differential master clock PLL__Y160P/N and CMOS-level master clock PLL__160C have the same frequency but are offset in phase by time $\Delta t_1$. Once WGATE3 and WGATE4 go low, N7 in ramp waveform & threshold voltage generator 250, one of the differential outputs of flip-flop 512, goes high just after PLL__Y160P/N clock flip-flop 512. Similarly, once WGATE3 and WGATE4 go low, N5 in precoder & time-interleaver 210, the half-rate derived odd clock, goes high just after PLL__160C clocks flip-flop X4. For maximum precompensation delay, the sum of $\Delta t_1$ and $\Delta t_2$ should be minimized and be less than one half of the master clock period, although it is not necessary for $\Delta t_1$ to be zero. This maximum is achieved because the falling edge of PLL__160C is used to clock precoder 302.

Bias Current Generator

Bias current generator 285 takes one input, WPC__IINT, typically 25 $\mu$A, and, by mirroring WPC__IINT, generates eight bias currents used in the rest of the WPC circuit. Two other inputs, WGATE0 and WGATE1, were discussed in the previous section and these signals control bias current generator 285 during low-power and standby modes, respectively.

| Signal Name | Magnitude | Block Destination |
|---|---|---|
| $I_A$ | 100 μA | Output Pin Driver 280 |
| $I_B$ | 100 μA | Delayed Clock Pulse Generator 230 |
| $I_C$ | 100 μA | NRZ Modulator 240 |
| $I_D$ | 100 μA | Ramp Waveform & Threshold Voltage Generator 250 |
| $I_{DAC1}$ | 50 μA | Threshold Current Generator 270 |
| $I_{DAC2}$ | 50 μA | Threshold Current Generator 270 |
| $I_{B50A}$ | 50 μA | Ramp Waveform & Threshold Voltage Generator 250 |
| $I_{B50B}$ | 50 μA | Ramp Waveform & Threshold Voltage Generator 250 |

Figure 12:
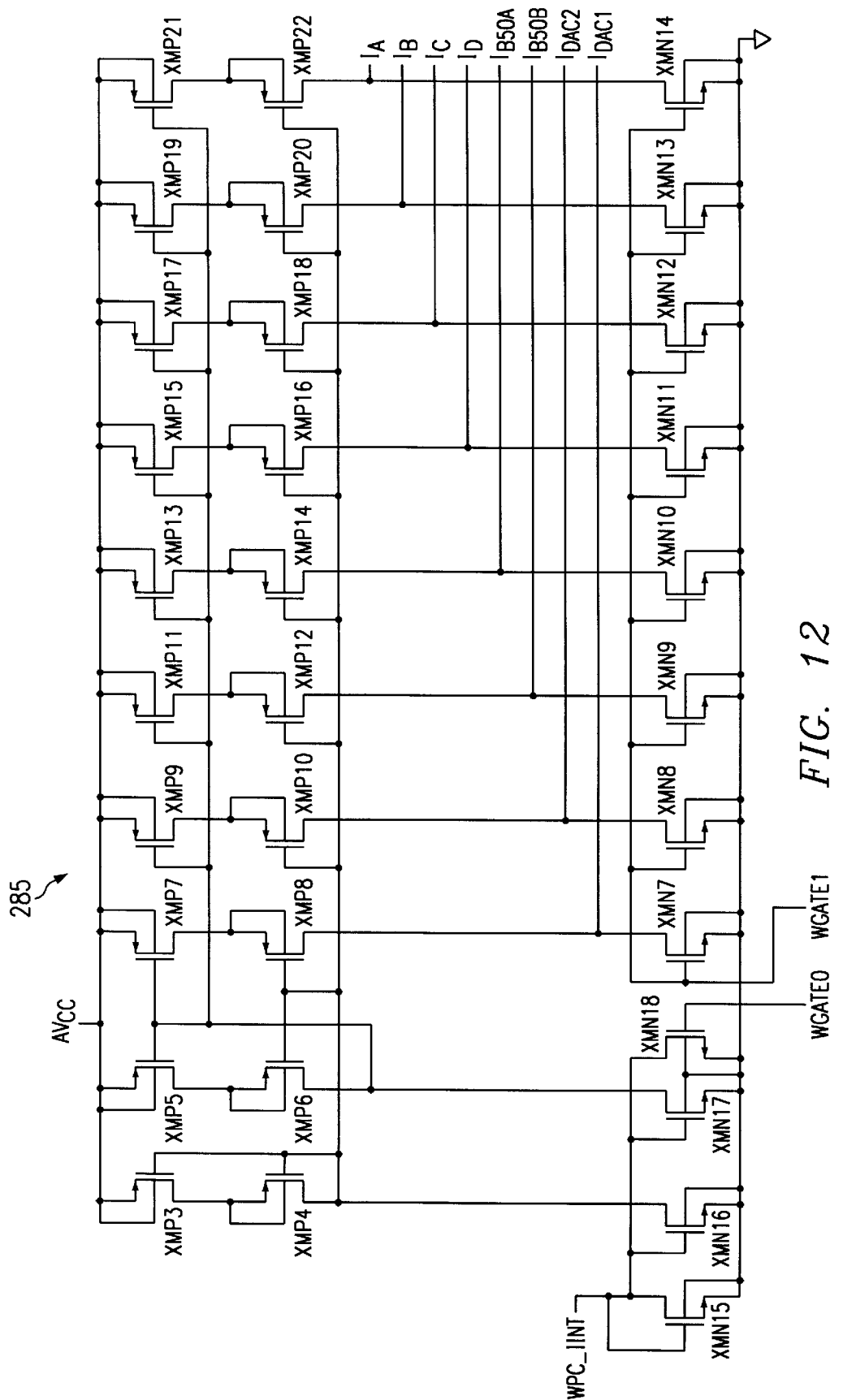
FIG. 12 is a circuit schematic of the bias current generator of FIG. 2.

A circuit schematic of bias current generator 285 is illustrated in FIG. 12. The transistors are designed with different feature sizes to provide the correct multiple of WPC_IINT. XMP5, XMP7, XMP9, XMP11, and XMP13 have a width of 40 μm and a length of 3 μm, and XMP6, XMP8, XMP10, XMP12, and XMP14 have a width of 40 μm and a length of 1 μm. These transistors provide 50 μA for $I_{B50A}$, $I_{B50B}$, $I_{DAC1}$, and $I_{DAC2}$. XMP15, XMP17, XMP19, and XMP21 have a width of 80 μm and a length of 3 μm, and XMP16, XMP18, XMP20, and XMP22 have a width of 80 μm and a length of 1 μm. These transistors provide 100 μA for $I_A$, $I_B$, $I_C$, and $I_D$. XMP3 has a width of 20 μm and a length of 3 μm, and XMP4 has a width of 20 μm and a length of 1 μm.

In normal mode, when WGATE0 and WGATE1 are low, XMN7–XMN14 are cut off and XMN15–XMN18 control WPC_IINT so that it flows to the circuit, generating the bias currents. In standby mode, when WGATE1 is high, XMN7–XMN14 sink the bias currents to ground. In low-power mode, when WGATE0 is high, XMN15–XMN18 control WPC_IINT so that it flows to ground, shutting off all the bias currents.

Although using a time-interleaving scheme is the preferred embodiment of the present invention because it is easier to generate a ramp waveform which ramps for half a master clock period, a system that does not time-interleave the data is also encompassed by this invention. Such a system generates a ramp waveform which operates at the master clock rate and which ramps throughout the full master clock period. At least one of the delayed clocks is high for at least half of each master clock period, and preferably for at least three-quarters of each master clock period.

Although the present invention has been described in detail, it should be understood that various changes, substitutions, and alterations can be made hereto without departing from the spirit and scope of the invention as defined by the appended claims.

What is claimed is:

1. A circuit for generating a write precompensation signal having precompensation delay, said circuit comprising:
   a precoder for precoding serialized input data to generate a precoded data signal operating at a master clock rate;
   a delayed clock pulse selector for generating clock pulse selection signals based on said precoded data;
   a delayed clock pulse generator for generating at least two delayed clock signals, for selecting either none or one of said delayed clock signals according to said clock pulse selection signals, and for generating a return-to-zero (RZ) signal whose time periods comprise either a zero if no delayed clock signal is selected or a pulse of said selected delayed clock signal; and
   a non-return-to-zero (NRZ) modulator for generating said precompensation signal from said RZ signal,
   wherein the maximum precompensation delay of said precompensation signal is at least 50% of the master clock time period.

2. The circuit according to claim 1, wherein said precoder comprises:
   a D-flip flop whose-clock input operates at said master clock rate;
   an XOR gate, having said serialized input data as a first input and having the output of said D-flip flop as a second input,
   wherein the output of said XOR gate is provided to the data input of said D-flip flop and
   wherein the output of said D-flip flop is the precoded data signal.

3. The circuit according to claim 1, wherein said delayed clock pulse generator generates four delayed clock signals.

4. The circuit according to claim 3, wherein if the current precoded data bit equals zero, said delayed clock pulse generator selects no delayed clock signal, and wherein if the current precoded data bit equals one, said delayed clock pulse generator selects one delayed clock signal based on the values of the previous two precoded data bits, wherein:
   a first delayed clock signal is selected when the previous two precoded data bits both equal zero;
   a second delayed clock signal is selected when the previous two precoded data bits equal a zero and a one, respectively;
   a third delayed clock signal is selected when the previous two precoded data bits equal a one and a zero, respectively; and
   a fourth delayed clock signal is selected when the previous two precoded data bits both equal one.

5. The circuit according to claim 1, further comprising a ramp waveform and threshold voltage generator for generating at least one ramp waveform and at least two threshold voltages, wherein said delayed clock pulse generator compares said at least one ramp waveform to said threshold voltages to generate said delayed clock signals.

6. The circuit according to claim 5, further comprising a current-proportional-to-frequency generator for generating a current proportional to said master clock rate and providing said current to said ramp waveform and threshold voltage generator, wherein the peak-to-peak voltage of said at least one ramp waveform is maintained constant regardless of said master clock rate.

7. The circuit according to claim 6, further comprising:
   a time-interleaver for time-interleaving said precoded data signal into odd and even data sequences each operating at half said master clock rate,
   wherein:
      said clock pulse selection signals are based on said time-interleaved data sequences;
      said current to said delayed clock pulse generator generates at least two odd and two even delayed clock signals and generates an odd RZ signal and an even RZ signal, said odd and even RZ signals operating at half said master clock rate; and
      said NRZ modulator generates said RZ signal by combining said odd and even RZ signals.

8. The circuit according to claim 7, wherein said ramp waveform and threshold voltage generator generates odd and even ramp waveforms.

9. The circuit according to claim 7, wherein said time-interleaver comprises:
- a D-flip flop for generating an odd clock signal and an even clock signal each operating at half the master clock rate, the clock input of said D-flip flop operating at said master clock rate;
- a series of odd D-flip flops clocked by said odd clock signal; and
- a series of even D-flip flops clocked by said even clock signal,
wherein said precoded data signal is provided to said odd and even series of D-flip flops.

10. A method for generating a write precompensation signal having precompensation delay, said signal operating at a master clock rate, said method comprising the steps of:
- precoding serialized input data operating at said master clock rate;
- generating at least two delayed clock signals;
- selecting either none or one of said delayed clock signals based on said precoded data;
- generating a return-to-zero (RZ) signal operating at said master clock rate, each time period of said RZ signal comprising either a zero if no delayed clock signal is selected or a pulse of said selected delayed clock signal; and
- generating said precompensation signal as a non-return-to-zero (NRZ) version of said RZ signal,
wherein the maximum precompensation delay of said precompensation signal is at least 50% of the master clock time period.

11. The method according to claim 10, wherein said preceding step comprises the steps of:
- providing said serialized input data to a first input of an XOR gate having two inputs;
- providing the output from said XOR gate to the input of a D-flip flop whose clock input operates at said master clock rate; and
- providing the output from said D-flip flop to the second input of said XOR gate,
wherein said output from said D-flip flop is a precoded data signal.

12. The method according to claim 10, wherein said delayed clock signal generating step generates four delayed clock signals.

13. The method according to claim 12, wherein said delayed clock signal selecting step comprises the steps of:
- if the current precoded data bit equals zero, selecting no delayed clock signal; and
- if the current precoded data bit equals one, selecting a delayed clock signal based on the values of the previous two precoded data bits,
wherein:
- a first delayed clock signal is selected when the previous two precoded data bits both equal zero;
- a second delayed clock signal is selected when the previous two precoded data bits equal a zero and a one, respectively;
- a third delayed clock signal is selected when the previous two precoded data bits equal a one and a zero, respectively; and
- a fourth delayed clock signal is selected when the previous two precoded data bits both equal one.

14. The method according to claim 10, wherein said delayed clock signal generation step comprises the steps of:
- generating a ramp waveform;
- generating a threshold voltage;
- providing said threshold voltage to the non-inverting input of a comparator; and
- providing said ramp waveform to the inverting input of said comparator,
wherein the output of said comparator is one of said delayed clock signals.

15. The method according to claim 14, wherein said ramp waveform has a constant peak-to-peak voltage regardless of said master clock rate.

16. The method according to claim 15, further comprising the steps of:
- time-interleaving said precoded data signal into odd and even data sequences each operating at half said master clock rate; and
- generating at least two odd and two even delayed clock signals,
wherein said RZ signal is a combination of an odd RZ signal and an even RZ signal, said odd and even RZ signals operating at half said master clock rate.

17. The method according to claim 16, wherein said time-interleaving step comprises the steps of:
- generating an odd clock signal and an even clock signal each operating at half the master clock rate; and
- providing said precoded data to an odd series of D-flip flops clocked by said odd clock signal and to an even,series of D-flip flops clocked by said even clock signal.

18. A method of writing to a disk, said method comprising the steps of:
- serializing data operating at a master clock rate;
- time-interleaving said serialized data into odd and even data sequences each operating at half said master clock rate;
- generating an odd return-to-zero (RZ) signal and an even RZ signal, each RZ signal operating at half said master clock rate, said odd RZ signal based on said odd data sequence and said even RZ signal based on said even data sequence; and
- combining said odd and even RZ signals to create a combined RZ signal operating at said master clock rate.

19. A hard disk drive recording system comprising:
- a circuit for generating a write precompensation signal having precompensation delay, said circuit comprising:
- a precoder for precoding serialized input data to generate a precoded data signal operating at a master clock rate;
- a delayed clock pulse selector for generating clock pulse selection signals based on said precoded data;
- a delayed clock pulse generator for generating at least two delayed clock signals, for selecting either none or one of said delayed clock signals according to said clock pulse selection signals, and for generating a return-to-zero (RZ) signal whose time periods comprise either a zero if no delayed clock signal is selected or a pulse of said selected delayed clock signal; and
- a non-return-to-zero (NRZ) modulator for generating said precompensation signal from said RZ signal,
wherein the maximum precompensation delay of said precompensation signal is at least 50% of the master clock time period.

20. The circuit according to claim 19, wherein said precoder comprises:
- a D-flip flop whose clock input operates at said master clock rate;
- an XOR gate, having said serialized input data as a first input and having the output of said D-flip flop as a second input,
- wherein the output of said XOR gate is provided to the data input of said D-flip flop and
- wherein the output of said D-flip flop is the precoded data signal.

21. The circuit according to claim 20, wherein if the current-precoded data bit equals zero, said delayed clock pulse generator selects no delayed clock signal, and wherein if the current precoded data bit equals one, said delayed clock pulse generator selects one delayed clock signal based on the values of the previous two precoded data bits, wherein:
- a first delayed clock signal is selected when the previous two precoded data bits both equal zero;
- a second delayed clock signal is selected when the previous two precoded data bits equal a zero and a one, respectively;
- a third delayed clock signal is selected when the previous two precoded data bits equal a one and a zero, respectively; and
- a fourth delayed clock signal is selected when the previous two precoded data bits both equal one.

* * * * *